United States Patent [19]
Tanaka et al.

[11] Patent Number: 5,636,219
[45] Date of Patent: Jun. 3, 1997

[54] SYSTEM FOR PROCESSING SYNCHRONIZATION SIGNALS WITH PHASE SYNCHRONIZATION IN MOBILE COMMUNICATION NETWORK

[75] Inventors: Hironao Tanaka; Toshiya Tsuji; Junichi Owada, all of Tokyo, Japan

[73] Assignee: NEC Corporation, Tokyo, Japan

[21] Appl. No.: 599,358

[22] Filed: Feb. 9, 1996

Related U.S. Application Data

[62] Division of Ser. No. 445,002, May 19, 1995, which is a division of Ser. No. 995,721, Dec. 23, 1992, Pat. No. 5,426,633.

[30] Foreign Application Priority Data

| Jun. 2, 1992 | [JP] | Japan | 4-141214 |
| Jun. 2, 1992 | [JP] | Japan | 4-141223 |
| Jun. 9, 1992 | [JP] | Japan | 4-149041 |

[51] Int. Cl.[6] ................................. H04J 3/06
[52] U.S. Cl. ................ 370/513; 370/516; 375/364; 340/825.14
[58] Field of Search .............. 370/100.1, 101, 370/102, 103, 104.1, 105, 105.1, 105.2, 105.3, 105.4, 108, 106, 107, 58.2; 375/354, 356, 357, 358, 359, 362, 364, 365, 366, 368, 375, 371, 373; 340/825.2, 825.14

[56] References Cited

U.S. PATENT DOCUMENTS

| 3,725,593 | 4/1973 | Palombari | 370/16 |
| 4,006,314 | 2/1977 | Condon et al. | 370/100.1 |
| 4,488,290 | 12/1984 | Dunn et al. | 370/100.1 |
| 4,598,413 | 7/1986 | Széchényi | 370/105 |
| 5,014,271 | 5/1991 | Fujimoto et al. | 370/105.3 |
| 5,117,424 | 5/1992 | Cohen et al. | 370/107 |
| 5,134,609 | 7/1992 | Mori et al. | 370/105.1 |
| 5,210,755 | 5/1993 | Nagler et al. | 370/108 |

FOREIGN PATENT DOCUMENTS

0242117  10/1987  European Pat. Off. .

OTHER PUBLICATIONS

Patent Abstracts of Japan, vol. 10, No. 170, Jun. 17, 1986 & JPA-61-023-433.

(List continued on next page.)

*Primary Examiner*—Wellington Chin
*Assistant Examiner*—Huy D. Vu
*Attorney, Agent, or Firm*—Sughrue, Mion, Zinn, Macpeak & Seas

[57] ABSTRACT

A system is provided for processing synchronization signals. A plurality of synchronization signals are received having different periods and different degrees of priority, and are used to generate a regenerated synchronization signal in response to clock pulses. A selector is used for selecting a selected synchronization signal, from among those received synchronization signals having a correct period. The selected synchronization signal is chosen based upon the different degrees of priority. A nonvolatile memory stores memorized synchronization signal and an allowable phase range. An address counter, which receives as an input a controllable initial value, counts the clock pulses to produce a clock count over a period of time, and to cause the nonvolatile memory to output the stored synchronization signal as a read-out synchronization signal and to output the stored allowable phase range as a read-out range, in response to the clock count. The controllable initial value, which is used as an input to the counter, is controlled by a timing control. The timing control is supplied with the selected synchronization signal from the selector and the read-out phase range from the nonvolatile memory. The timing control changes the value of the controllable initial value at such a time so as to cause the read-out synchronization signal and the read-out phase to be read from the nonvolatile memory when the selected synchronization signal has a phase in said read-out phase range.

1 Claim, 17 Drawing Sheets

OTHER PUBLICATIONS

IEEE Transactions on Communications, vol. 38, No. 6, Jun. 1990, pp. 830–837, N. Mehravari et al., "Frame Synchronization in a Photonic Network of Time Multiplexed Space Switches Via a Feedback Scheme".

Patent Abstracts of Japan, vol. 10, No. 384, Dec. 23, 1986.

NEC Research and Development, vol. 38, No. 37, pp. 15–22, H. Goto et al.., "Station Clocks for Datran Digital Data Network".

Proceedings of the 44th Annual Symposium of Frequency Control, May 23, 1990, pp. 117–126, S.M. Bass et al., "A Redundant Timing Source for digital Telecommunication Network Synchronization".

NEC Research and Development, No. 3, Apr. 1979, pp. 87–100, H. Kaneko et al., "Digital Data Transmission System and Equipment".

International Switching Symposium 1979, May 7, 1979, p. 221, H. Suckfull et al., "Architecture of a New Line of Digital Switches".

International Switching Symposium 1984, vol. 2, May 7, 1984, pp. 34B.3.1–34B.3.7, BS. Vianna et al., "Tropico R — Characteristics and Internal Structure".

Elektrotechnik Und Informationstechnik, vol. 106, No. 11, Nov. 1989, pp. 485–495, Pollhuber, "Hardware–Struktur und Hardware–Funktion der System–Variante OES–S des osterreichischen DIgitalen Telefonsystems".

Telcom Report Special, vol. 10, Mar. 1987, pp. 180–185, D. Niethammer, "Netztaktversorgung NTV–2 mit hochstabiler und redundanter Taktregenerierung fur digitale Fernmeldenetze".

Patent Abstracts of Japan, vol. 12, No. 304, Apr. 4, 1988.

International Switching Symposium 1981, Sep. 21, 1981, pp. 14.1.1–14.1.9, M. Ballard et al., "The E10.S–Tss.5: A Multipurpose Digital Switching System".

FIG. 4

| B8 | B7 | B6 | B5 | B4 | B3 | B2 | B1 |

SYSTEM FOR PROCESSING SYNCHRONIZATION SIGNALS WITH PHASE SYNCHRONIZATION IN MOBILE COMMUNICATION NETWORK

This is a divisional of application Ser. No. 08/445,002 filed May 19, 1995, which is a divisional of application Ser. No. 07/955,721, filed Dec. 23, 1992 now U.S. Pat. No. 5,426,633.

BACKGROUND OF THE INVENTION

This invention relates to a synchronization signal processing system for use in a mobile communication network which comprises a plurality of mobile service switching centers and a plurality of base transceiver stations and is operable in a time division fashion.

The mobile communication network has an overall service area which is divided into cells or radio zones assigned with the base transceiver stations, respectively, and in which a plurality of mobile stations are present, namely, either moving or staying standstill, at a time. Each mobile station may be either a portable telephone device carried by a user or a subscriber's terminal installed in an automobile or in a like mobile vehicle and is movable from a first zone of the cells to a second zone of the cells.

It is possible to understand that each mobile service switching center is connected to a plurality of fixed subscriber substations either directly or through at least one exchange office. Some of the mobile service switching centers are connected to the base transceiver stations. More particularly, each of such mobile service switching centers is connected to a certain number of base transceiver stations.

The mobile service switching centers are connected to one another by wired communication lines. The mobile service switching centers and the base transceiver stations may be connected through wired communication lines. Among the overall service area, some of the cells are often referred to collectively as a radio communication area when assigned to the base transceiver stations which are served by one of the mobile service switching centers.

Each base transceiver station is for transmitting and receiving radio message signals to and from at least one of the mobile stations that is currently present in the cell assigned with the base transceiver station under consideration. For use in time division multiple access (TDMA), the radio message signals are carried by a radio carrier signal of a radio frequency in a plurality of time slots. A predetermined number of such time slots are successively arranged in a frame in the manner known in the art.

When a particular station of the mobile stations moves between the first and the second zones assigned with first and second stations of the base transceiver stations, the first and the second stations use different radio frequencies and different time slots in transmitting and receiving the radio message signals to and from the particular station. The first and the second stations may be connected either to one or to two of the base transceiver stations. In either event, the particular station is inevitably subjected to a handover processing between the first and the second stations. It is therefore desirable to preliminarily synchronize the frames and the time slots in the base transceiver stations in order to reduce a time necessary for such a handover processing as a handover processing time.

In the manner which will later be described, a conventional synchronization signal processing system comprises an individual synchronization signal generating circuit in each mobile service switching center. When connected to such a mobile service switching center, the base transceiver station can generate synchronized frames and synchronized time slots for the mobile stations which are currently present in the radio communication area served by the base transceiver station under consideration.

A little more in detail, the synchronization signal generating circuit comprises first and second time division switches, each comprising controllable connection paths and producing a switch trouble signal when a trouble occurs therein. A controller device is cross connected to the first and the second time division switches and is supplied with the switch trouble signal to control the connection paths of one of the first and the second time division switches that is not producing the switch trouble signal and serves as an active switch with the other of the first and the second time division switches used as a standby switch. A synchronization signal generator is connected to the active switch to supply a synchronization signal to the connection paths of the active switch. Output trunk circuits are connected to the connection paths of the first and the second time division switches to supply the synchronization signal to at least one of the output trunk circuit from the connection paths controlled by the controller device to the base transceiver stations served by mobile service switching center in question.

It is liable that the synchronization signal generator is involved into a trouble. First and second synchronization signal generators are therefore cross connected to the first and the second time division switches. Alternatively, it is possible to understand that the first and the second synchronization signal generators are connected to the active switch. In either event, each synchronization signal generator produces a generator trouble signal when a trouble occurs therein. Supplied with the generator trouble signal, the controller device controls the connection paths of the active switch to supply the output trunk circuits with the synchronization signal generated by one of the first and the second synchronization signal generators that is not producing the generator trouble signal.

As a consequence, the conventional synchronization signal processing system can deal with troubles that may occur in the time division switches and/or in the synchronization signal generators. It is, however, impossible to keep the phase of the synchronization signal when the first and the second synchronization signal generators are switched from one to the other.

SUMMARY OF THE INVENTION

It is consequently a principal object of the present invention to provide a synchronization signal processing system for use in a mobile communication network comprising a plurality of mobile service switching centers and a plurality of base transceiver station, which system is used in common to the mobile service switching centers in making the base transceiver stations of the network produce radio message signals with frames and time slots synchronized.

It is a subordinate object of this invention to provide a synchronization signal processing system which is of the type described to comprises a plurality of time division switches and a plurality of synchronization signal generators and which can make the base transceiver stations substantially continuously produce the radio message signals even when a trouble occurs in at least one of the time division switches or in at least one of the synchronization signal generators.

Other objects of this invention will become clear as the description proceeds.

According to an aspect of this invention, there is provided a synchronization signal processing system comprising: (A) a time division switch comprising controllable connection paths; (B) a plurality of synchronization signal generators for generating phase synchronization signals to the connection paths, each of the synchronization signal generators producing a generator trouble signal when a trouble occurs therein; (C) a plurality of synchronization signal selectors for selecting a selected synchronization signal from the phase synchronized synchronization signals supplied through the connection paths to supply the selected synchronization signal to the connection paths, each of the synchronization signal selectors producing a selector trouble signal when a trouble occurs therein; and (D) a controller device for controlling the connection paths to make the connection paths receive in response to the generator trouble signal the phase synchronization signal generated by one of the synchronization signal generators and receive in response to the selector trouble signal the selected synchronization signal selected by one of the synchronization signal selectors, the above-mentioned ones of the synchronization signal generators and selectors being different from the synchronization signal generators and selectors by which the generator and the selector trouble signals are produced.

According to a different aspect of this invention, there is provided a synchronization signal processing system which is for use in a local switching center comprising a time division switch for receiving a received synchronization signal from a higher hierarchy switching center and for producing clock pulses and which comprises: (A) an address counter initialized by the received synchronization signal to count the clock pulses and to produce an address signal; (B) a nonvolatile memory for memorizing a memorized synchronization signal; and (C) reading means for reading the memorized synchronization signal by the address signal as a regenerated synchronization signal with the regenerated synchronization signal given a phase determined by initialization of the address counter.

According to a further different aspect of this invention, there is provided a synchronization signal processing system which processes a plurality of received synchronization signals having their periods and different degrees of priority to generate a regenerated synchronization signal in response to clock pulses and which comprises: (A) selecting means for selecting, from at least one of the received synchronization signals that has its period correctly, a selected synchronization signal in consideration of the different degrees of priority; (B) a nonvolatile memory for memorizing a memorized synchronization signal and an allowable phase range; (C) an address counter responsive to the clock pulses for accessing the nonvolatile memory with a controllable timing to make the nonvolatile memory produce the memorized synchronization signal as the regenerated synchronization signal and the allowable phase range as a read-out phase range; and (D) timing control means supplied with the selected synchronization signal and the read-out phase range for controlling the controllable timing to phase synchronize the regenerated synchronization signal with the selected synchronization signal within the allowable phase range.

According to a still further different aspect of this invention, there is provided a synchronization signal processing system which is for use in a local switching center of a local hierarchy in processing synchronization signals of zeroth and first series and which comprises trunk devices of the zeroth and the first series, wherein each of the trunk devices is of one of the zeroth and the first series and comprises: (A) a synchronization signal regenerate and relay circuit supplied with the synchronization signals and a selected synchronization signal of the other of the zeroth and the first series as three input signals, giving different degrees of priority to the three input signals, monitoring whether the three input signals are normal or abnormal, selecting as a normal signal in accordance with the different degrees of priority one of the synchronization signals in a first one of a plurality of controllable states and one of the three input signals in a second one of the controllable states that are normal, and generating as a particular signal of the above-mentioned one of the zeroth and the first series a regenerated synchronization signal with its phase adjusted to the normal signal, wherein the selected synchronization signal is the regenerate synchronization signal generated as a particular signal of the other of the zeroth and the first series by the synchronization signal regenerated and relay circuit of one of the trunk devices that is of the other of the zeroth and the first series; (B) a hierarchy indicator for producing a hierarchy indication signal indicative of whether or not the local hierarchy is a highest hierarchy, a master/slave indicator for producing a local master/slave indication signal exclusively indicative of master and slave states; (C) an output switch for producing the particular signal of the above-mentioned one of the zeroth and the first series as an output synchronization signal unless the hierarchy indication signal indicates that the local hierarchy is the highest hierarchy; (D) hierarchy control means for controlling the controllable states into first and second states when the hierarchy indication signal is and is not indicative of the highest hierarchy; (E) master/slave control means for controlling the first state into primary and secondary states and the second state into the first and the second ones of the controllable states when the master/slave indication signal indicates the master and the slave states; and (F) a monitor circuit for monitoring whether the particular signal of the above-mentioned one of the zeroth and the first series is normal or abnormal, the monitoring circuit producing an alarm signal and making the master/slave indication signal always indicate the slave state when the particular signal of the above-mentioned one of the zeroth and the first series is abnormal; (A') the synchronization signal regenerate and relay circuit of the aforementioned each of the trunk devices selecting the normal signal from none of the three input signals in the primary state, from only the selected synchronization signal in the secondary state, from only the synchronization signals in the first one of the controllable state, and from all of the three input signals in the second one of the controllable states.

According to a yet further different aspect of this invention, there is provided a synchronization signal processing system for use in a local switching center of a local hierarchy in processing received synchronization signals of zeroth and first series with the received synchronization signals received from a higher hierarchy switching center as zeroth and first received synchronization signals and which comprises: (A) a synchronization trunk device of the zeroth series as a zeroth synchronization trunk device; and (B) a synchronization trunk device of the first series as a first synchronization trunk device; (AB) the zeroth and the first synchronization trunk devices producing a particular signal of the zeroth series as a zeroth particular signal and a particular signal of the first series as a first particular signal, respectively; (A') the zeroth synchronization trunk device being supplied with the zeroth and the first received synchronization signals and the first particular signal as three primary input signals, giving primary degrees of priority to the primary input signals with the zeroth received synchronization signal and the first particular signal given highest and lowest degrees of priority, monitoring whether the primary input signals are normal or abnormal, selecting a primary normal signal in accordance with the primary degrees of priority one of the zeroth and the first received synchronization signal in the master state and one of the primary input signals in the slave state that are normal, and generating as the zeroth particular signal a primary regenerated synchronization signal with its phase adjusted to the primary normal signal; (B') the first synchronization trunk device being supplied with the zeroth and the first received synchronization signals and the zeroth particular signal as three secondary input signals, giving secondary degrees of priority to the secondary input signals with the first received synchronization signal and the zeroth particular signal given highest and lowest degrees of priority, monitoring whether the secondary input signals are normal or abnormal, selecting a secondary normal signal in accordance with the secondary degrees of priority one of the zeroth and the first received synchronization signals in the master state and one of the secondary input signals in the slave state that are normal, and generating as the first particular signal a secondary regenerated synchronization signal with its phase adjusted to the secondary normal signal.

BRIEF DESCRIPTION OF THE DRAWING

FIG. 4 schematically shows a format of a frame synchronization signal for use in describing the synchronization signal processing system depicted in FIG. 1;

Figure 1:
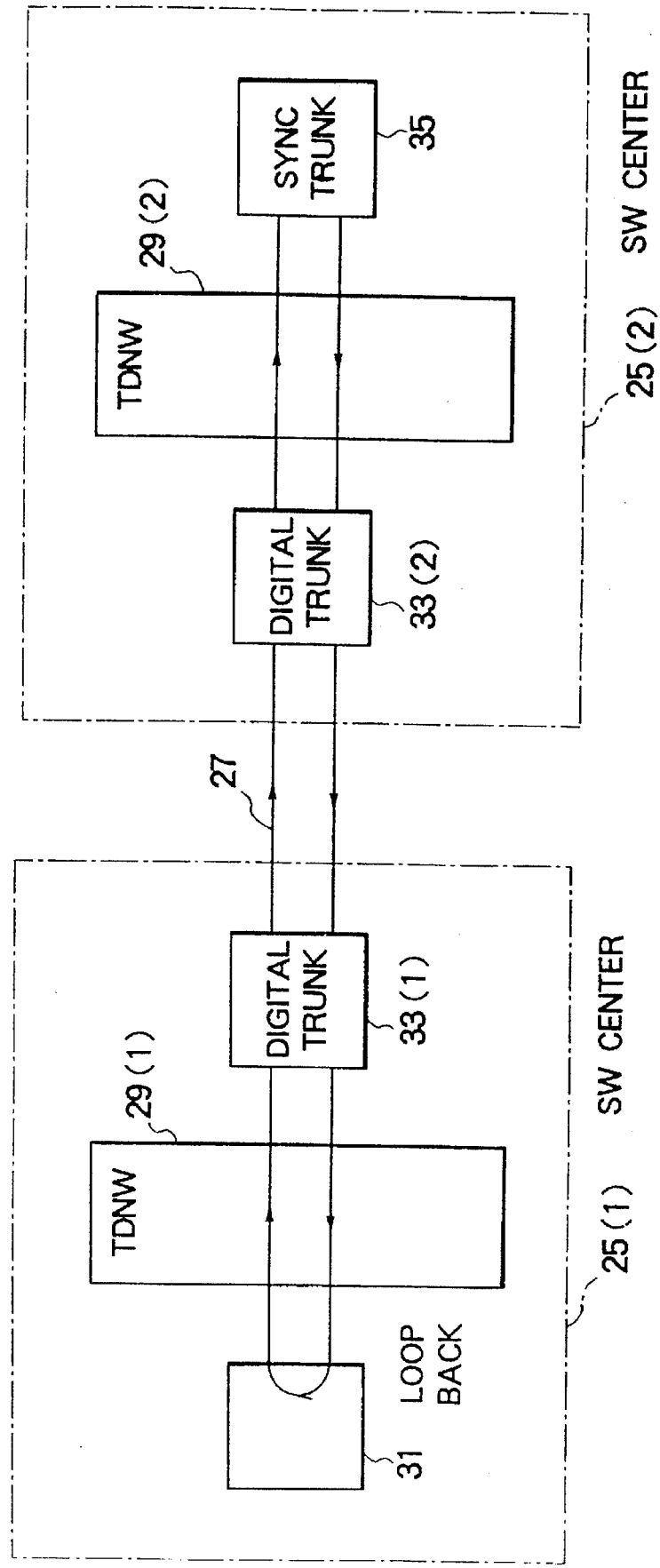
FIG. 1 is a general block diagram of a synchronization signal processing system according to the instant invention.

DESCRIPTION OF THE PREFERRED EMBODIMENTS:

Referring to FIG. 1, a synchronization signal processing system of the present invention is for use in a mobile communication network of the type described heretobefore. Only a part of the mobile communication network is illustrated.

The mobile communication network comprises a plurality of mobile service switching centers which are connected to one another through wired communication lines in a hierarchical manner. More particularly, the mobile service switching centers include a single central master (CM) mobile service switching center (MSC), a plurality of local master (LM) mobile service switching centers, and a great number of terminal (TM) mobile service switching centers. The local master mobile service switching central centers are lower hierarchy centers and connected to the master center mobile service switching center which serves as a highest hierarchy center. A plurality of the terminal mobile service centers are connected as lower hierarchy centers to each local master mobile service switching centers which serves as a higher hierarchy center relative to the terminal mobile service switching centers. A plurality of base transceiver stations (BTS) are connected through wired communication lines to each terminal mobile service switching centers in the manner known in the art. It is possible to use a radio communication line or channel as a certain one of the wired communication lines particularly between one terminal mobile service switching center and a certain one of the base transceiver station.

It is known in the art in the manner described hereinabove that the mobile communication network has an overall service area which is divided into cells or radio zones assigned with the base transceiver stations, respectively. In the overall service area, a plurality of mobile stations are present, namely, either moving or staying standstill, at a time.

Each base transceiver station is for transmitting and receiving radio message signals to and from at least one of the mobile stations that is currently present in the call assigned with the transceiver station under consideration. When attention is directed to such a base transceiver station, the message signals are carried by a radio carrier signal of a radio frequency in a plurality of time slots. A predetermined number of such time slots are consecutively arranged in a frame.

When a particular unit of the mobile stations moves between first and second zones of the cells assigned with first and second stations of the base transceiver stations, the first and the second stations ordinarily use different radio frequencies and generally use different time slots in transmitting and receiving the radio message signals to and from the particular station. The synchronization signal processing system is for synchronizing the frames and the time slots used by the base transceiver stations of the mobile communication network.

In FIG. 1, the radio communication network comprises higher and lower hierarchy switching (SW) centers 25(1) and 25(2) connected by a wired connection line 27. The synchronization signal processing system comprises first and second time division switches (TDNW) 29(1) and 29(2) in the higher and the lower hierarchy switching centers 25 (suffixes omitted). The first and the second time division switches 29 (suffixes omitted) are primarily for exchanging or switching wired message signals between the switching centers 25 for transmission and reception of the radio message signals to and from mobile stations (not shown) at the base transceiver stations (not shown) connected to the lower hierarchy switching center 25(2) either directly or through at least one further lower hierarchy switching center (not shown).

In the higher hierarchy switching center 25(1), a loop back device 31 and a first digital trunk circuit 33(1) are connected to the first time division switch 29(1). In the lower hierarchy switching center 25(2), a second digital trunk circuit 33(2) and a synchronization (SYNC) trunk circuit 35 are connected to the second time division switch 29(2).

Figure 2:
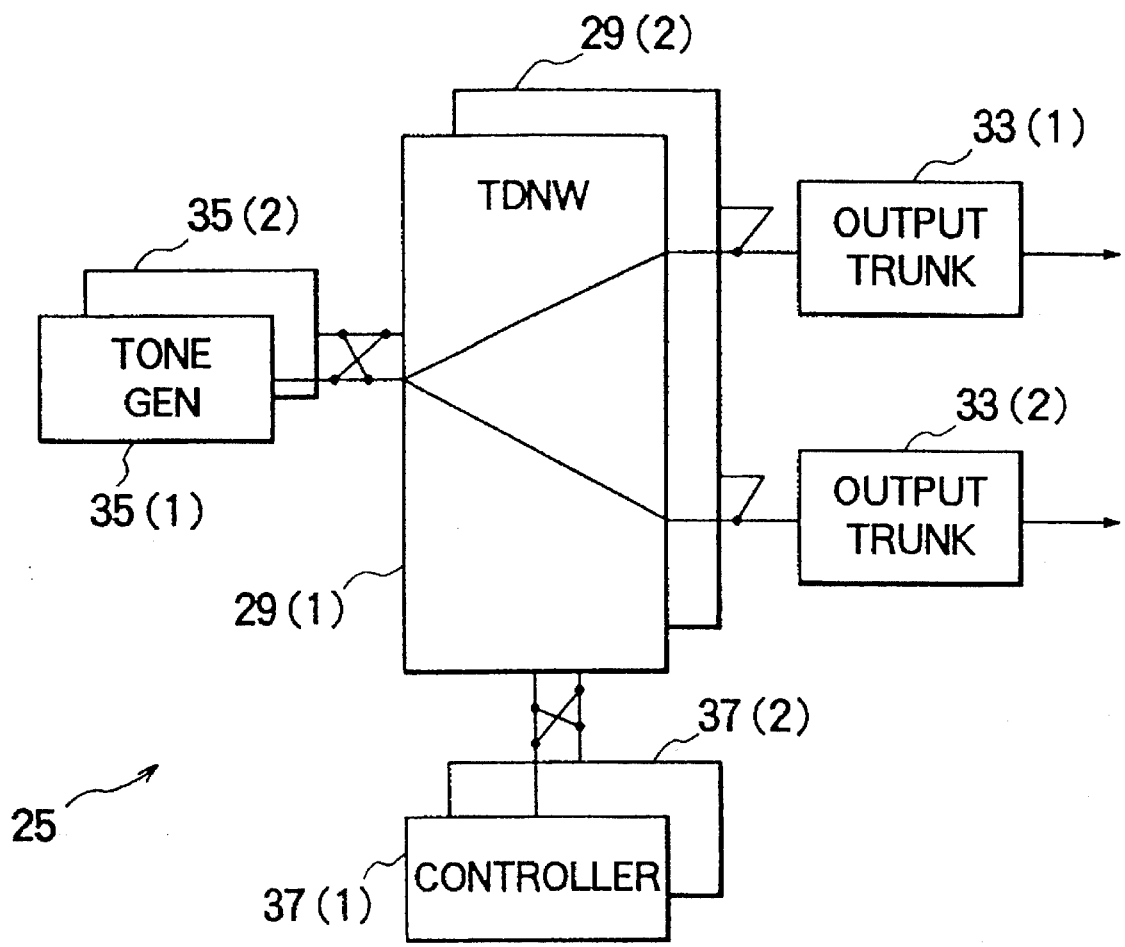
FIG. 2 is a block diagram of a conventional signal processing system.
Figure 3:
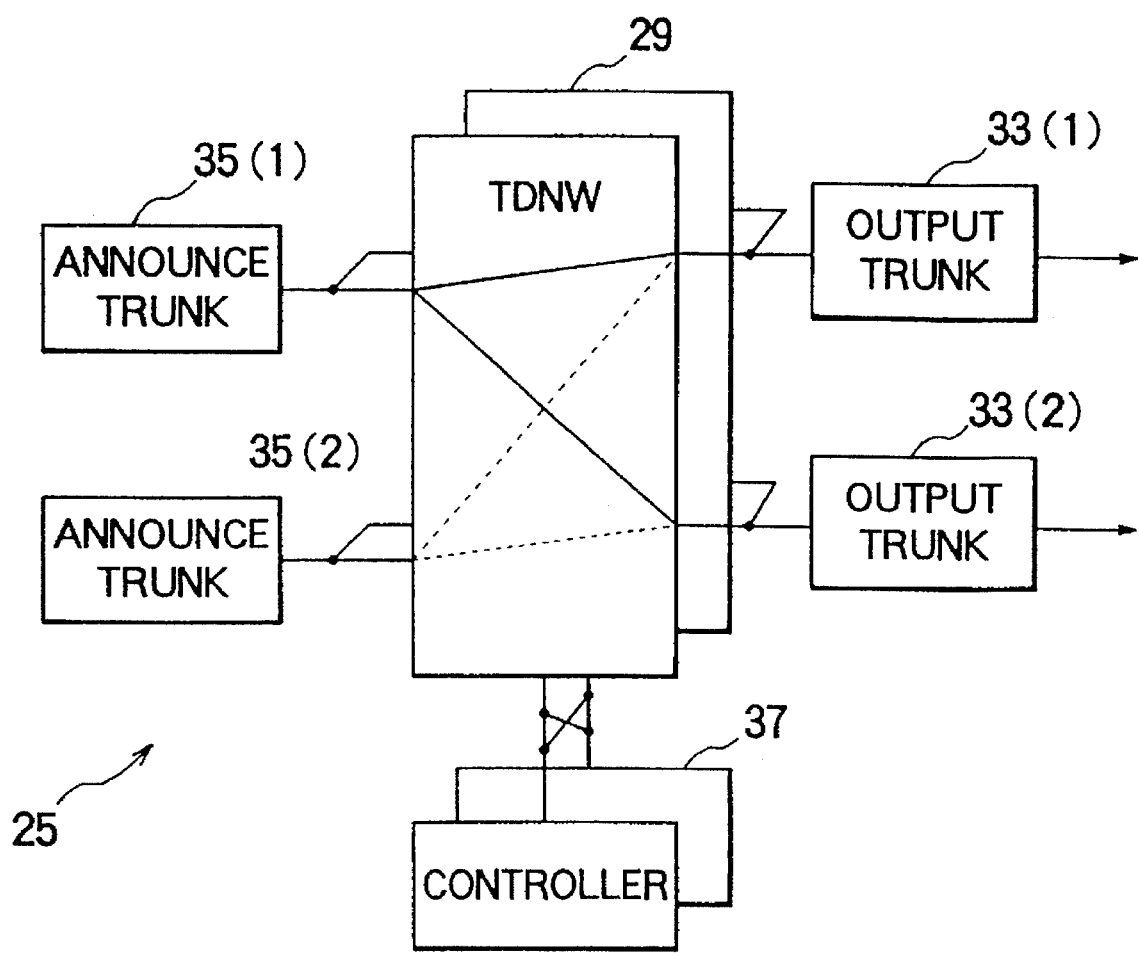
FIG. 3 is a block diagram of another conventional signal processing system.

Turning to FIGS. 2 and 3, conventional signal processing systems will now be described in order to facilitate an understanding of this invention. Similar parts are designated by like reference numerals.

In FIG. 2, the signal processing system is a tone signal distributing circuit used in each of the mobile service switching centers 25. First and second time division switches 29(1) and 29(2) are used in the mobile service switching center. Each of the time division switches 29 (suffixes omitted as before) comprises controllable connection paths, only two of which are exemplified.

First and second tone generators 35(1) and 35(2) are for generating first and second tone signals and cross connected to the time division switches 29 to supply the first and the second tone signals to the connection paths of the switches 29. First and second output trunk circuits 33(1) and 33(2) are connected to the connection paths of the switches 29.

Each of the switches 29 produces a switch trouble signal when a trouble occurs therein. Each of the tone generators 35 (suffixes omitted) produces a generator trouble signal when a trouble occurs therein.

Cross connected to the switches 29 and supplied with the switch trouble signal, first and second controllers 37(1) and 37(2) control the connection paths of one of the switches 29 that serves as an active switch, being different from the other of the switches 29 that is producing the switch trouble signal to serve as a standby switch. If one of the controllers 37 (suffixes omitted) is involved in a trouble, the other of the controllers 37 is used.

Supplied with the generator trouble signal, the controllers 37 control the connection paths of the active switch to make the connection paths of the active switch supply the output trunk circuits 33 (the suffixes omitted as before) with the tone signal generated by one of the tone generators 35 that is different from the other tone generator by which the generator trouble signal is produced.

In FIG. 3, the signal processing system is an announcement signal distributing circuit used in each of the mobile service centers 25. First and second announcement trunks 35(1) and 35(2) are connected to the connection paths of the first and the second time division switches 29.

The first and the second announcement trunk 35 (suffixes omitted) are for generating a common announcement signal to serve as announcement signal generators. Each of the announcement trunks 35 produces a generator trouble signal when a trouble occurs therein. In other respects, the announcement signal distributing circuit is similar to the tone signal distributing circuit illustrated with reference to FIG. 2.

One of the announcement trunks 35 is therefore used as an active trunk that is different from the other announcement trunk producing the generator trouble signal as a standby trunk. In the active switch, the connection paths are depicted by solid lines when the connection paths are connected to the active trunk. The connection paths are shown by dashed lines when connected to the standby trunk.

In the conventional signal processing systems, the tone generators in FIG. 2 are duplicated equipments for switches, and the announcement trunks in FIG. 3 are signal equipment for switches. Ordinarily, the signals produced by the tone generators and announcement trunks are asynchronous. Therefore, the signal phase supplied to output trunk jumps before and after trouble occurrence. It is necessary to avoid such a signal phase jump in order to establish a synchronization signal processing system.

Figure 4:
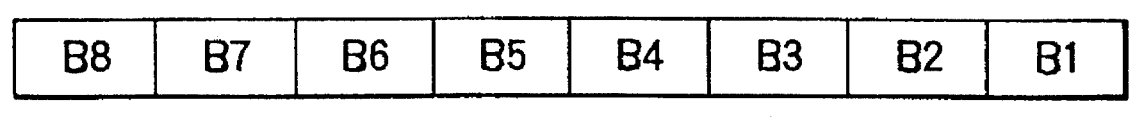

Referring to FIG. 4, a synchronization signal consists of first through eighth bits B1 to B8. More in general, such synchronization signals are transmitted among the central master, the local master, and the terminal mobile service switching centers.

Referring particularly to FIG. 4, it is preferred that the synchronization signal consists of a zeroth and a first channel. The eighth bit B8 indicates the zeroth and the first channels by binary zero and one. The seventh bit B7 is used as a multiframe synchronization signal indicative of multiframes and is given a binary one value once in each duration of T×(N+1) second, where T represents a duration of one frame period, N representing a predetermined integer. The sixth bit B6 is used as a loop back signal. The fifth through the first bit B5 to B1 have no concern with the following description.

Referring back to FIG. 1, the synchronization signal is transmitted between the higher and the lower hierarchy switching centers 25 through the wired connection line 27. Supplied with the loop back signal from the lower hierarchy switching center 25(2) through the first digital trunk circuit 33(1) and the first time division switch 29(1), the-loop back device 31 loops back or returns back the loop back signal towards the lower hierarchy switching center 25(2).

By so using the loop back signal, the lower hierarchy switching center 25(2) can know a propagation delay time (a phase difference) which is necessary to send the loop back signal towards the higher hierarchy switching center 25(1) and to receiver the loop back signal from the higher hierarchy switching center 25(1). On making the output trunk circuit 33 send wired communication signals from the second time division switch 29(2) either to still lower hierarchy switching centers or to the base transceiver stations served by the lower hierarchy switching center 25(2), the multiframe synchronization signal is given a lead of a half of the propagation delay time.

Figure 5:
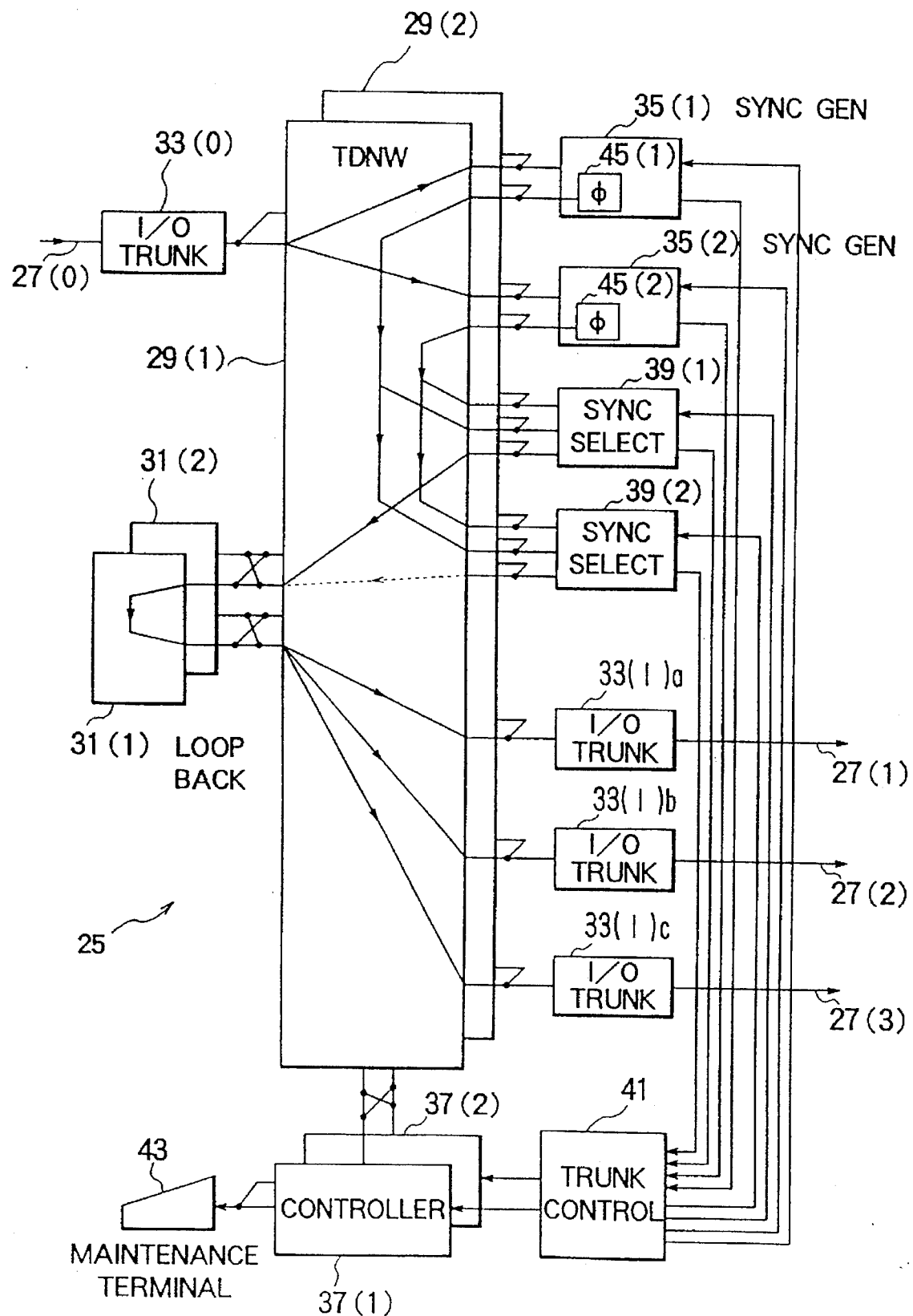
FIG. 5 is a block diagram of a synchronization signal processing system according to a first embodiment of this invention.

Referring now to FIG. 5, the description will proceed to a synchronization signal processing system according to a first embodiment of this invention. Similar parts are designated by like reference numerals and are similarly operable with likewise named signals.

In FIG. 5, the synchronization signal processing system is shown in one of the local master and the terminal mobile service switching centers that corresponds in FIG. 1 to the lower hierarchy switching center 25(2). The first and the second time division switches 29 are cross connected to first and second loop back devices 31(1) and 31(2) and to the first and the second controllers 37. Producing a loop back device trouble signal, one of the loop back devices 31 (suffixes omitted) serves as a standby loop device when a trouble occurs therein. The other of the loop back devices 31 serves as an active loop device.

A single input/output (I/O) trunk circuit 33(0) corresponds to the second digital trunk circuit 33(2) described in conjunction with FIG. 1 and serves as an input trunk circuit. First through third input/output trunk circuits 33 (1)a, 33(1) b, and 33(1) collectively correspond to the first digital trunk circuit 33(1) of FIG. 1 and individually serve as output trunk circuits.

A higher connection line 27(0) connects the single input/output trunk circuit 33(0) to one of input/output trunk circuits which a higher hierarchy switching center, such as 25(1) of FIG. 1, comprises in correspondence to the first through the third input/output trunk circuits 33 (suffixes omitted). A first lower connection line 27(1) connects the first input/output trunk circuit 33(1)a to a single input/output trunk circuit corresponding to the single input/output trunk circuit 33(0) in one of still lower hierarchy switching center and the base transceiver stations which are served by the switching center being illustrated. Second and third lower connection lines 27(2) and 27(3) are similarly used. It should be noted that the single input/output trunk circuit 33(0) is depicted as an input trunk circuit. The first through the third input/output trunk circuits 33 are illustrated as output trunk circuits.

First and second synchronization signal (SYNC) generators 35(1) and 35(2) collectively correspond to the synchronization trunk circuit 35 described in connection with FIG. 1 and are connected to the active switch of the first and the second time division switches 29. First and second synchronization signal (SYNC) selectors 39(1) and 39(2) are connected to the active switch.

If produced by the first and the second synchronization signal generators 35, the generator trouble signals are supplied to a trunk control circuit 41. Each of the synchronization signal selectors 39 (suffixes omitted) produces a selector trouble signal when a trouble occurs therein. Such selector trouble signals are supplied to the trunk control circuit 41. Responsive to the generator and/or the selector trouble signal, the trunk control circuit 41 keeps one of the synchronization signal generators 35 and selectors 39 as an active generator or selector that is different from the synchronization signal generator 35 and selector 39 producing the generator and the selector trouble signals as standby generator and selectors.

A maintenance terminal 43 is connected to the controllers 37. The first and the second synchronization signal generators 35 comprise first and second phase adjusters (φ) 45(1) and 45(2). In the manner which will presently become clear, a combination of the controllers 37 and the trunk control circuit 41 serves as a controller device.

In operation, the synchronization signal is delivered from the higher hierarchy switching center through the single input/output trunk circuit 33(0) to the active switch of the first and the second time division switches 29. Through the connection paths indicated by solid lines with arrowheads, the synchronization signal of the higher hierarchy switching center is supplied to the active generator of the first and the second synchronization signal generator 35 as a generator input signal. Supplied with the generator input signal, the first and the second synchronization signal generators 35 generate, if both are active generators, phase synchronized synchronization signals which are phase synchronized with the generator input signal. The synchronization signal generators 35 supply the phase synchronized synchronization signals to the active switch. In this event, the synchronization signal generator 35 deliver the phase synchronized synchronization signals to the active switch with the phase adjusters 45 (suffixes omitted) put out of operation.

Through the connection paths of the active switch, the phase synchronized synchronization signals are supplied to the synchronization signal selectors 39. Each synchronization signal selector 39 checks normality of the synchronization signals received from synchronization signal generators 35 and autonomously selects a selected synchronization signal from the phase synchronized synchronization signal to supply the selected synchronization signal to the active switch. Selection of the selected synchronization signal will later become clear. Incidentally, the connection paths between the loop back device 31 and the synchronization signal selectors 39 of the time division switches 29 are switched on the basis of information collected by the trunk control circuit 41 from the synchronization signal selectors 39.

Through the connection path indicated by a solid line with an arrowhead, the active switch supplies the selected synchronization signal to the first and the second loop back devices 31. In the example being illustrated, the active loop device merely folds back the selected synchronization signal towards the first through the third input/output trunk circuits 33 with a common phase through connection paths of the active switch.

Use of the loop back devices 31 makes it additionally possible to change the connection paths of the active switch only between the synchronization signal selectors 39 and the loop back devices 31 rather than between the synchronization signal selectors 39 and the first through the third input/output trunk circuits 33 on putting one and the other of the synchronization signal selectors 39 into the active and the standby selectors. This enables high-speed operation of switch between the active and the standby selectors.

The high-speed operation is enabled for the following reasons. It will be assumed at a time that the first synchronization signal selector 39(1) is the active selector and the second synchronization signal selector 39(2) is the standby selector. If the loop back devices 31 were not used, the first synchronization signal selector 39(1) must be switched to the standby selector by dealing with three paths leading therefrom to three input-output trunk circuits 33(1)a to 33(1)c. The second synchronization signal selector 39(2) must be switched to the active selector by similarly dealing with three other paths. Use of the loop back devices 31 enables switching of their path only between the first and the second synchronization signal selectors 39.

When one of the synchronization signal generators 35 and one of the synchronization signal selectors 39 are put into the standby generator and selector, the trunk control circuit 41 informs this change to the maintenance terminal 43. When one of the time division switches 29, one of the loop back devices 31, and one of the controllers 37 are put into the standby switch, loop device, and controller, the active controller executes this change and informs the maintenance terminal 43 of this result.

Figure 6:
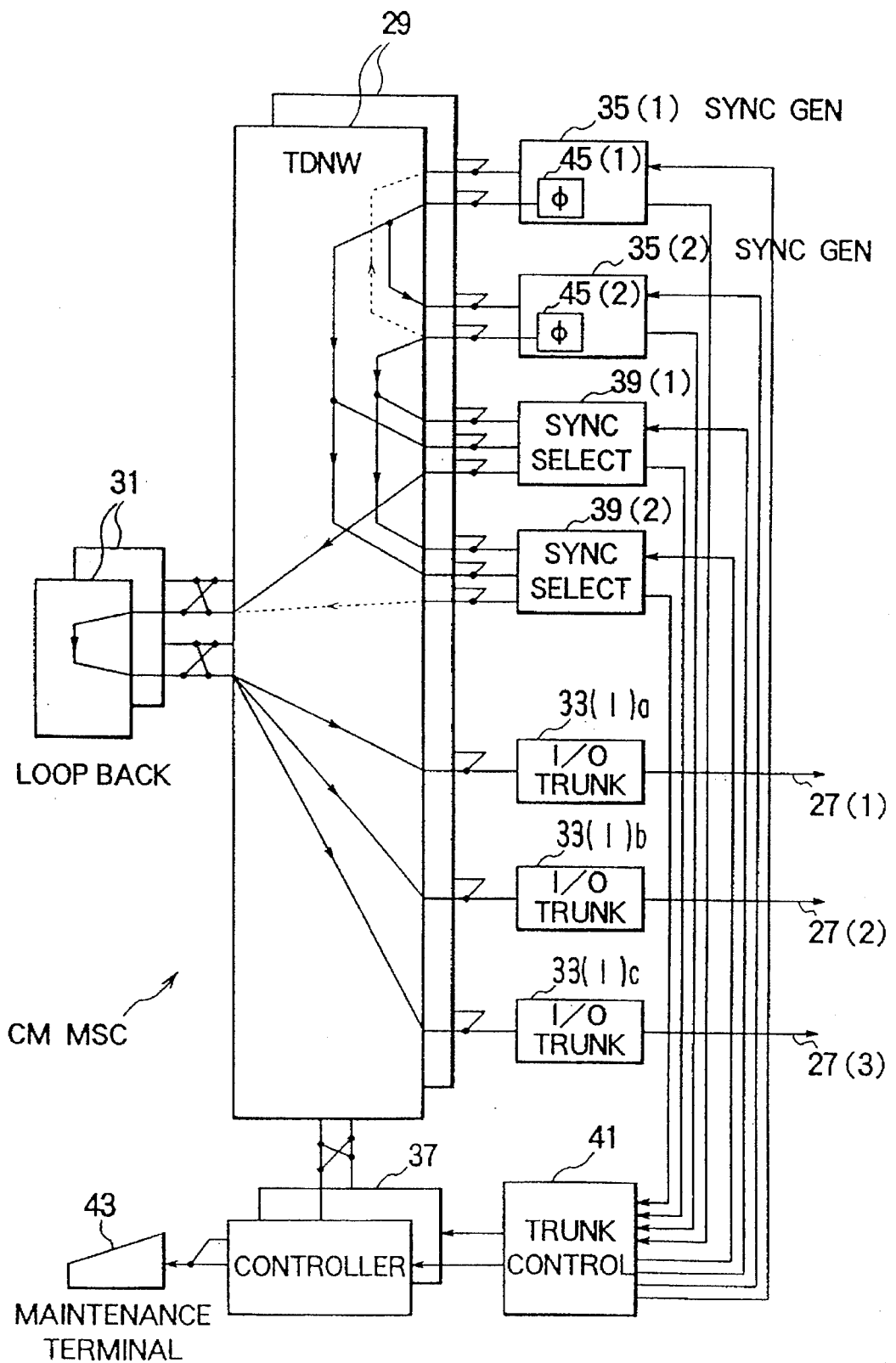
FIG. 6 is a block diagram of a synchronization signal processing system according to a second embodiment of this invention.

Referring to FIG. 6, the description will proceed to a synchronization signal processing system according to a second embodiment of this invention. Similar parts are designated by like reference numerals and are similarly operable with likewise named signals.

In FIG. 6, the synchronization signal processing system is depicted in the central master mobile service switching center CM MSC which may be the higher hierarchy switch 25(1) described in conjunction with FIG. 1. The synchronization signal processing system does not comprise the single input/output trunk circuit 33(0) described in connection with FIG. 5.

It will be assumed that the first synchronization signal generator 35(1) serves as the active generator and the second synchronization signal generator 35(2), as the standby generator. Under the circumstances, the first synchronization signal generator 35(1) generates an original synchronization signal without use of the first phase adjuster 45(1) to supply the original synchronization signal to the first and the second synchronization signal selectors 39 and additionally to the second synchronization signal generator 35(2). Responsive to the original synchronization signal, the second synchronization signal generator 35(2) generates a subordinate synchronization signal with the second phase adjuster 45(2) put into operation of phase adjusting the subordinate synchronization signal to the original synchronization signal.

When the first and the second synchronization signal generators 35 are the standby and the active generators, the original synchronization signal is generated by the second synchronization signal generator 35(2) and is supplied to the first synchronization signal generator 35(1) through a connection path indicated in the active switch by a dashed line. In this manner, the active and the standby generators are switched between the first and the second synchronization signal generators 35 with no phase shift introduced into the phase synchronized synchronization signals in the mobile service switching centers, such as 25(1) and 25(2) of FIG. 1, of the mobile communication network. Operation is not different in other respects in the synchronization processing system being illustrated.

Figure 7:
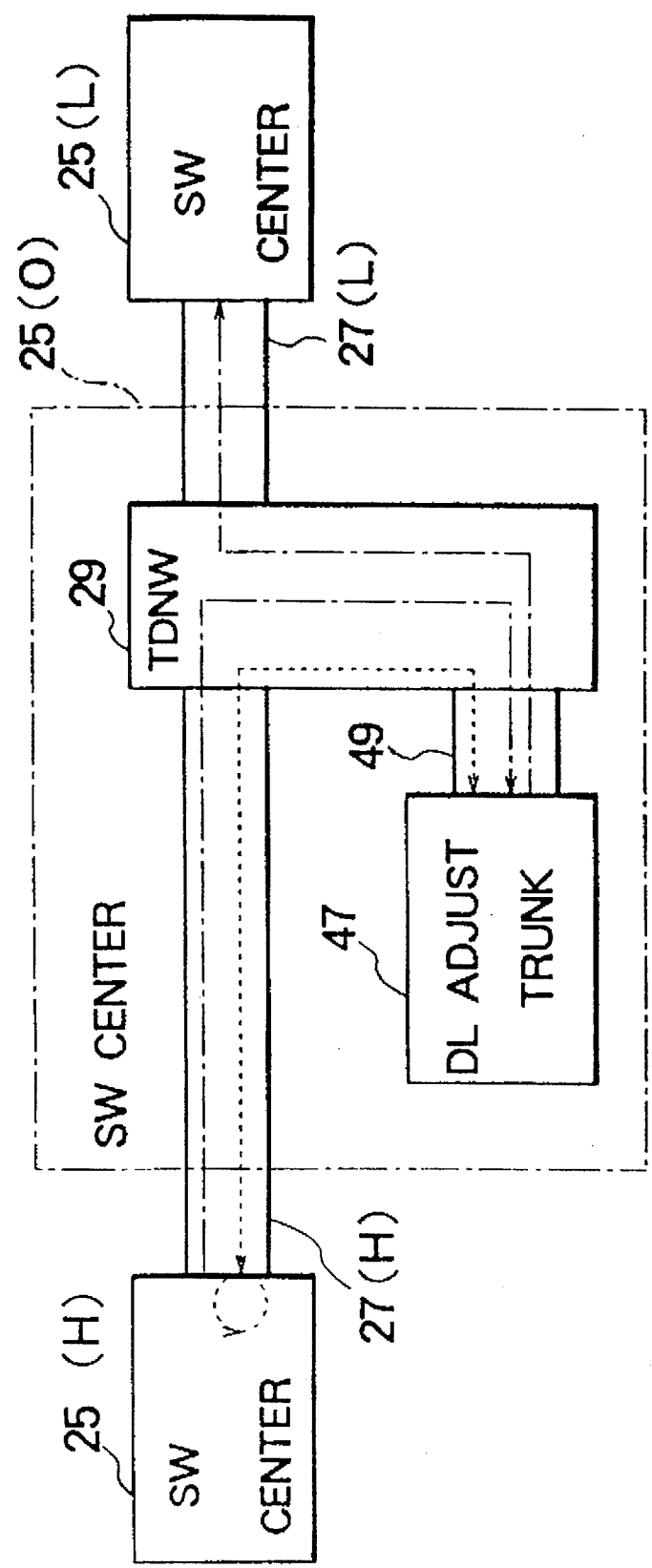
FIG. 7 is a partial block diagram of a mobile communication network which comprises a synchronization signal processing system according to a third embodiment of this invention.

Referring now to FIG. 7, a part of the mobile communication network is depicted from a different viewpoint and comprises a synchronization signal processing system according to a third embodiment of this invention. Similar parts are designated by like reference numerals with modifications in some respects.

A local mobile service switching center 25(O) has a certain degree of hierarchy and comprises a time division switch 29 which is connected to a higher hierarchy switching center 25(H) by a higher connection line 27(H) and to a lower hierarchy switching center 25(L) by a lower connection line 27(L).

A delay adjust (DL) trunk device 47 is connected to the time division switch 29 by an up-down highway 49. Merely for convenience of illustration, each of the higher and the lower connection line 27 (suffixes omitted) and of the up-down highway 49 is shown as a line of a wide diameter.

Signals are transmitted through the higher connection line 27(H) as a higher transmission signal, through the lower connection line 27(L) as a lower transmission signal, and through the up-down highway 49 as up and down highway signals. Each of the higher and the lower transmission signals and the up and the down highway signals is transmitted in frames and comprises the synchronization signal of the format illustrated with reference to FIG. 4.

The synchronization signal comprises the multiframe synchronization signal as an original synchronization signal in the higher transmission signal. The original synchronization signal is transmitted from the higher hierarchy switching center 25(H) through the higher connection line 27(H) in the manner indicated by a dash-dot line. Receiving the original synchronization signal through the time division switch 29 and the up-down highway 49 as a received synchronization signal, the delay adjust trunk device 47 produces a regenerated synchronization signal as a delay adjusted synchronization signal in the manner which will become clear in the following. The adjusted synchronization signal is delivered to the lower hierarchy switching center 25(L) as a multiframe synchronization signal in the lower transmission signal through the lower connection line 27(L) as indicated by another dash-dot line. The loop back signal is transmitted from the trunk device 47 through the up-down highway 49, the time division switch 29, and the higher connection line 27(H) to the higher hierarchy switching center 25(H) in the manner indicated by a dashed line, looped back at the higher hierarchy switching center 25(H) for return to the trunk device 47 as indicated by another dashed line.

Figure 8:
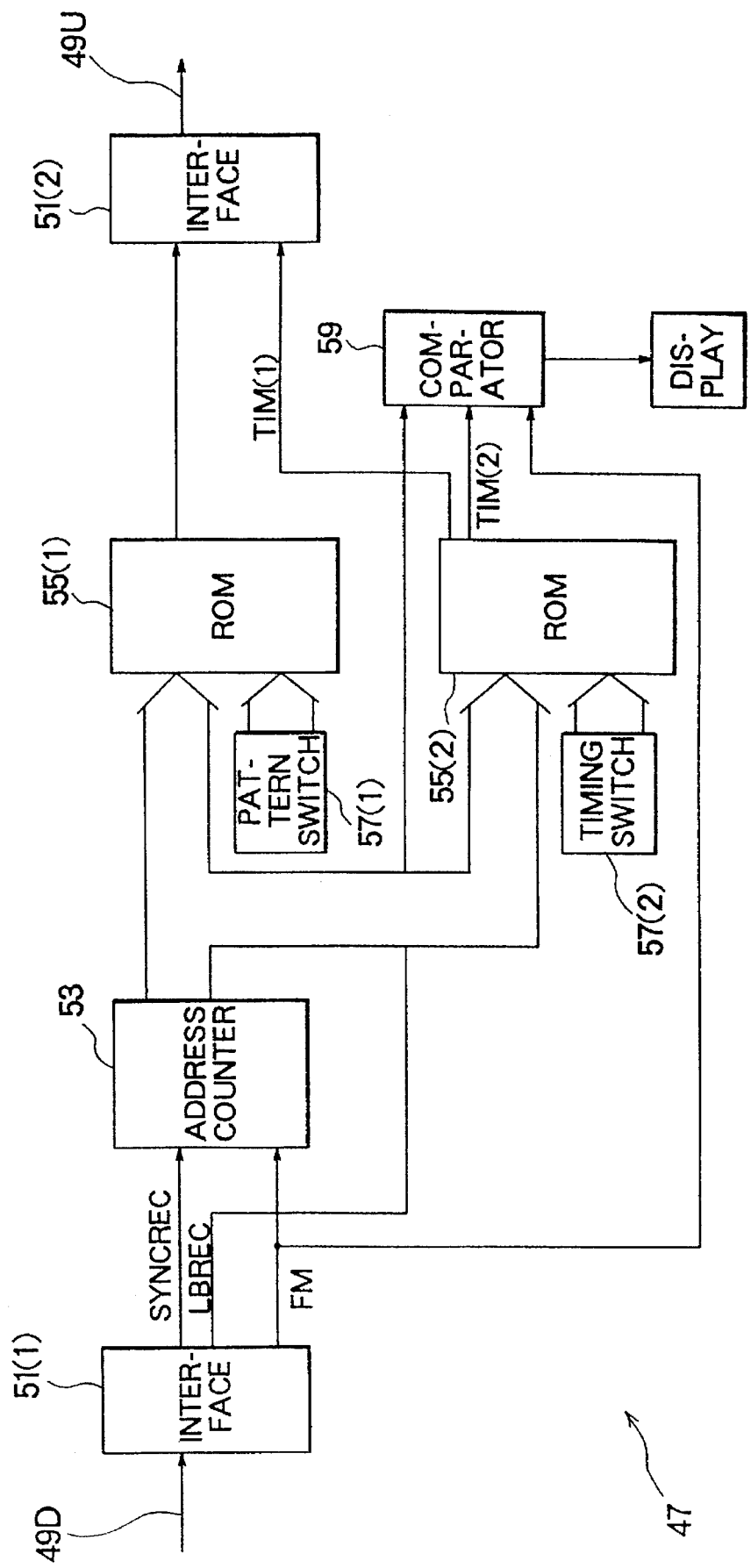
FIG. 8 is a block diagram of a delay adjust trunk device which is used in the synchronization signal processing system mentioned in connection with FIG. 7.
Figure 9:
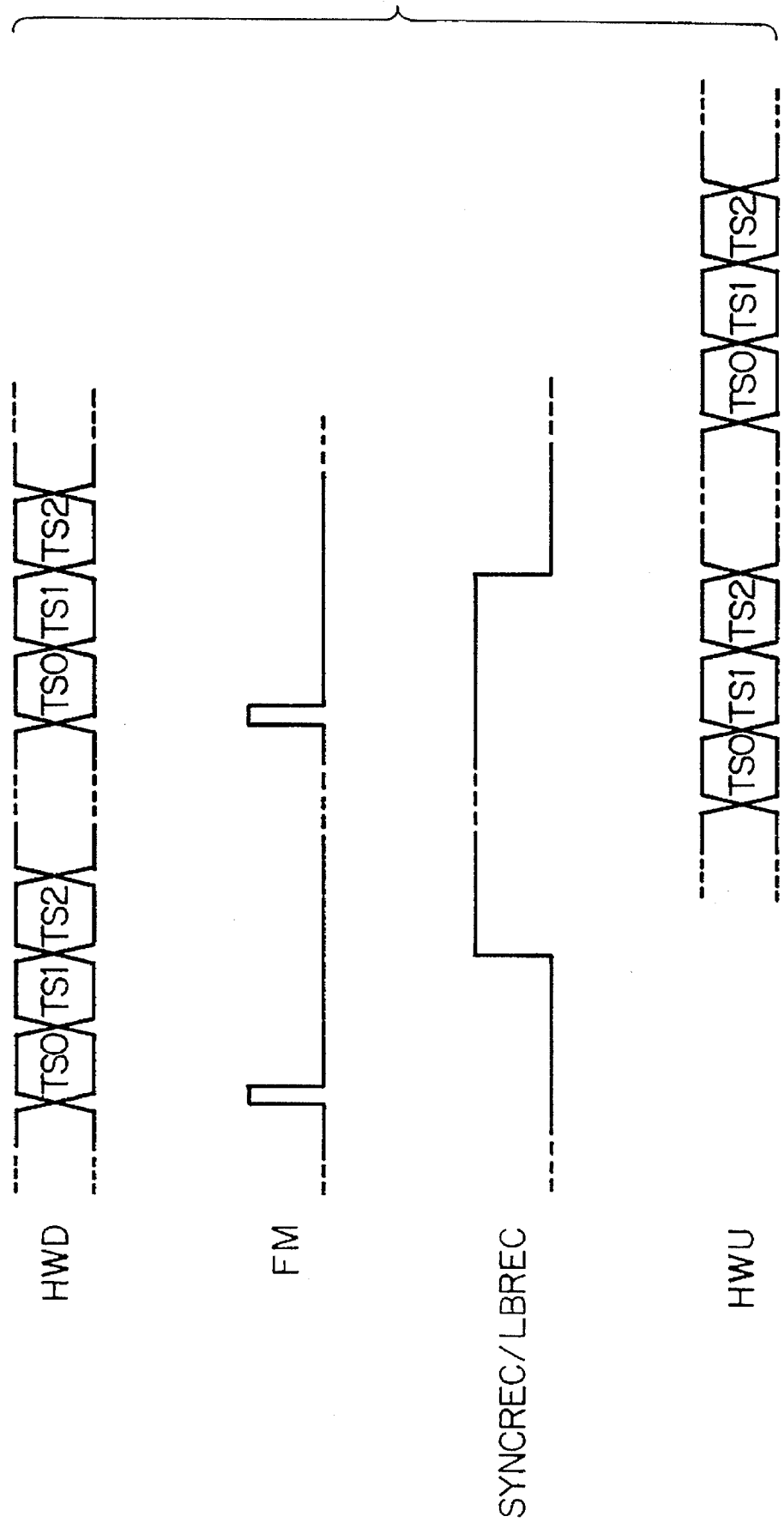
FIG. 9 is a time chart for use in describing operation of the delay adjust trunk device illustrated in FIG. 8.

Referring to FIGS. 8 and 9, the delay adjust trunk device 47 comprises input and output interfaces 51(1) and 51(2) connected to the time division switch 29 through a down highway 49D and through an up highway 49U. Through the down highway 49D, the time division switch 29 sends the higher transmission signal as a highway down signal HWD depicted in FIG. 9 along a top or first row labelled HWD. In the manner described before in conjunction with FIG. 4, the multiframe synchronization signal is given the binary one value once in each time duration of T×(N+1) seconds, where T represents a frame period, N representing a predetermined integer. The highway down signal is therefore divisible repeatedly into time slots TS(0), TS(1), TS(2), . . . , and TS(J), where J represents a predetermined natural number. One frame consists of (J+1) time slots TS(0) through TS(J).

The input interface 51(1) produces a frame pulse signal FM illustrated along a second row labelled FM. The input interface 51(1) furthermore produces a received synchronization signal SYNCREC which is given a binary one value, as depicted along a third row labelled SYNCREC, between the time slot TS(2) of a frame and the time slot TS(1) of a next frame, both inclusive. The received synchronization signal is alternatively called a receive loop back signal LBREC and is produced in response to the loop back signal looped back from the higher hierarchy switching center 25(H).

Figure 10:
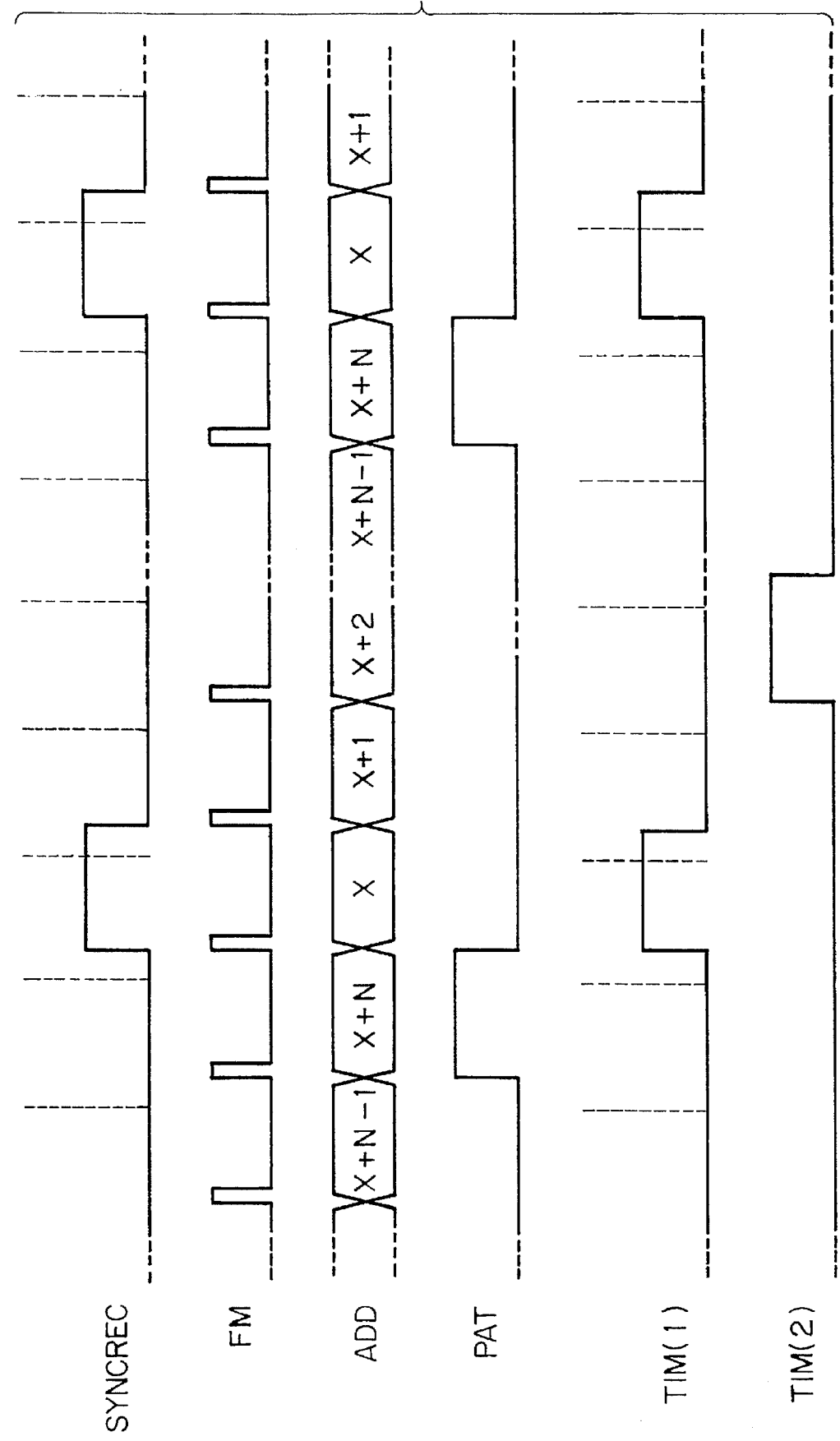
FIG. 10 is another time chart for use in describing operation of the delay adjust trunk device depicted in FIG. 8.

Turning to FIG. 10 during a short while, the received synchronization signal is depicted along a top or first row labelled SYNCREC. Frame periods are illustrated by dashed vertical lines and the multiframe periods, by solid vertical lines. The frame pulse signal is depicted along a second row labelled FM.

Turning back to FIG. 8 with FIG. 10 continuously referred to, an address counter 53 is reset to an initial value by the received synchronization signal SYNCREC and counts the frame pulses FM to produce an address signal ADD. Consequently, the address signal represents address counts, X, X+1, X+2, . . . , and X+N in each multiframe period in the manner illustrated in FIG. 10 along a third row labelled ADD, where X represents the initial value as an initial address value.

A first read-only memory (ROM) 55(1) is a nonvolatile pattern memory which has pattern addresses accessed by the address signal and preliminarily loaded with various signal patterns at the respective pattern addresses. By way of example, hexadecimal-zero patterns are stored in the pattern address accessed by the address counts X through X+N−1. A hexadecimal-four-zero patterns are stored in the address accessed by the address count X+N. In this manner, the pattern memory 51(1) memorizes the signal patterns collectively as a memorized synchronization signal.

A second read-only memory 55(2) is a nonvolatile timing memory which has timing addresses accessed by the address signal and preliminarily loaded with various timing patterns at the respective timing addresses. For example, hexadecimal-two-zero pattern is stored in the timing address accessed by the address count X, and hexadecimal-one pattern is stored at the address X+2. The hexadecimal-zero patterns are stored in other timing addresses.

A pattern switch circuit 57(1) specifies a predetermined signal pattern to give the initial address value X to the first read-only memory 55(1). It is possible to store the predetermined signal pattern in the pattern memory 55(1) at a time instant when the address count specifies a particular pattern address. In this case, the hexadecimal-four-zero pattern is stored at the address X+N. The pattern memory 55(1) therefore produces a pattern signal which represents the hexadecimal-four-zero pattern every time when the address signal indicates the address count X+N. The pattern signal is illustrated in FIG. 10 along a fourth row labelled PAT. The pattern signal is delivered to the output interface 51(2) for transmission as the delay adjusted synchronization signal.

A timing switch circuit 57(2) specifies a predetermined timing pattern to give the initial address value X to the second read-only memory 55(2). It is possible to store the predetermined timing pattern in the timing memory 55(2) at a time instant when the address signal specifies each of particular timing addresses. In this case, the hexadecimal-two-zero pattern is stored at the address X, and the hexadecimal-two pattern, at the address X+2. In each multiframe period, the timing memory 55(2) produces first and second timing signals TIM(1) and TIM(2). The first timing signal TIM(1) indicates that the timing memory 55(2) produces the hexadecimal-one pattern. The second timing signal TIM(2) indicates that the timing memory 55(2) produces the hexadecimal-two pattern. The first timing signal TIM(1) is delivered to the output interface 51(2) and used to specify the sixth bit B6 of the time slot TS(1) in a highway up signal which is transmitted through the up highway 49(U) to the switching center 25(H) via the switch 29 and the higher connection line 27(H).

The second timing signal TIM(2) is delivered to a comparator 59, which is supplied from the input interface 51(1) with the frame pulse signal and the loop back receive signal extracted from the sixth bit B6 of the time slot TS(2). Timed by the frame pulse signal, the comparator 59 compares phases of the second timing signal and the received loop back signal. A comparison result signal represents a phase difference between the receive loop back signal and the second timing signal and is displayed on a display device.

If this phase difference is equal to zero, it is understood that the timing switch circuit 57(2) specifies the predetermined time pattern in a correct time relationship relative to the propagation delay time mentioned above by referring back to FIG. 1. By adjusting the particular timing addresses used in the timing switch circuit 57(2), it is possible to measure a roundtrip delay time. It is usual to use in the pattern switch circuit 57(1) the particular pattern address which is equal to a half of the roundtrip delay time on the propagation delay time.

Referring again to FIG. 9 in addition to FIGS. 8 and 10, it will be presumed that the propagation delay time is equal to one frame period. In this event, the pattern and the timing switch circuits 57 (suffixes omitted) are used in the manner exemplified above. The first timing signal is illustrated in FIG. 10 along a fifth row labelled TIM(1) and the second timing signal, along a sixth or bottom row labelled TIM(2). The highway up signal is depicted in FIG. 9 along a fourth or bottom row labelled HWU. The pattern signal is transmitted through the lower connection line 27(L) as the regenerated synchronization signal.

Reviewing FIGS. 7 through 10, it is possible to use a single nonvolatile memory for use as the pattern and the timing memories 55 (suffixes omitted) and a single switch circuit for use as the pattern and the timing switch circuits 57. It is furthermore possible to use a microcomputer (not shown) in automatically controlling either the single switch circuit or the pattern and the timing switch circuits 57 in response to the comparison result signal. The delay adjust trunk device 47 makes it readily possible to cope with the propagation delay time which may be different depending on a geographic distance between each pair of the center master, the local master, and the terminal mobile service switching centers.

A combination of the pattern switch circuit 57(1) and the output interface 51(2) serves as a signal pattern reading arrangement. Another combination of the timing switch circuit 57(2) and the output interface 51(2) serves as a timing pattern reading arrangement.

Figure 11:
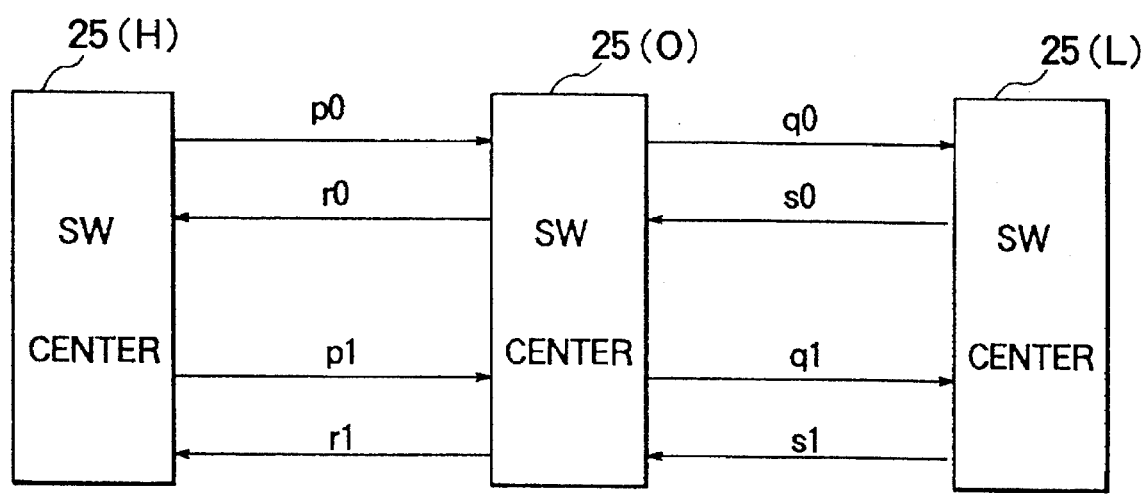
FIG. 11 is a partial block diagram of a mobile communication network which comprises a synchronization signal processing system according to a fourth embodiment of this invention.

Referring now to FIG. 11, a mobile communication network comprises similar parts designated by like reference numerals and comprises a synchronization signal processing system according to a fourth embodiment of this invention. It should be noted that similar synchronization signals are used in the synchronization signal processing system being illustrated.

It will be surmised that the synchronization signal is merely duplicated into zeroth and first series. The local switching center 25(O) therefore receives zeroth and first synchronization signals p0 and p1 from the higher hierarchy switching center 25(H) in a higher reception signal and transmits zeroth and first synchronization signals q0 and q1 to the lower hierarchy switching center 25(L) in a lower transmission signal. The local switching center 25(O) transmits zeroth and first synchronization signals r0 and r1 to the higher hierarchy switching center 25(H) in a higher transmission signal and receives zeroth and first synchronization signals s0 and s1 from the lower hierarchy switching center 25(L) in a lower reception signal.

Figure 12:
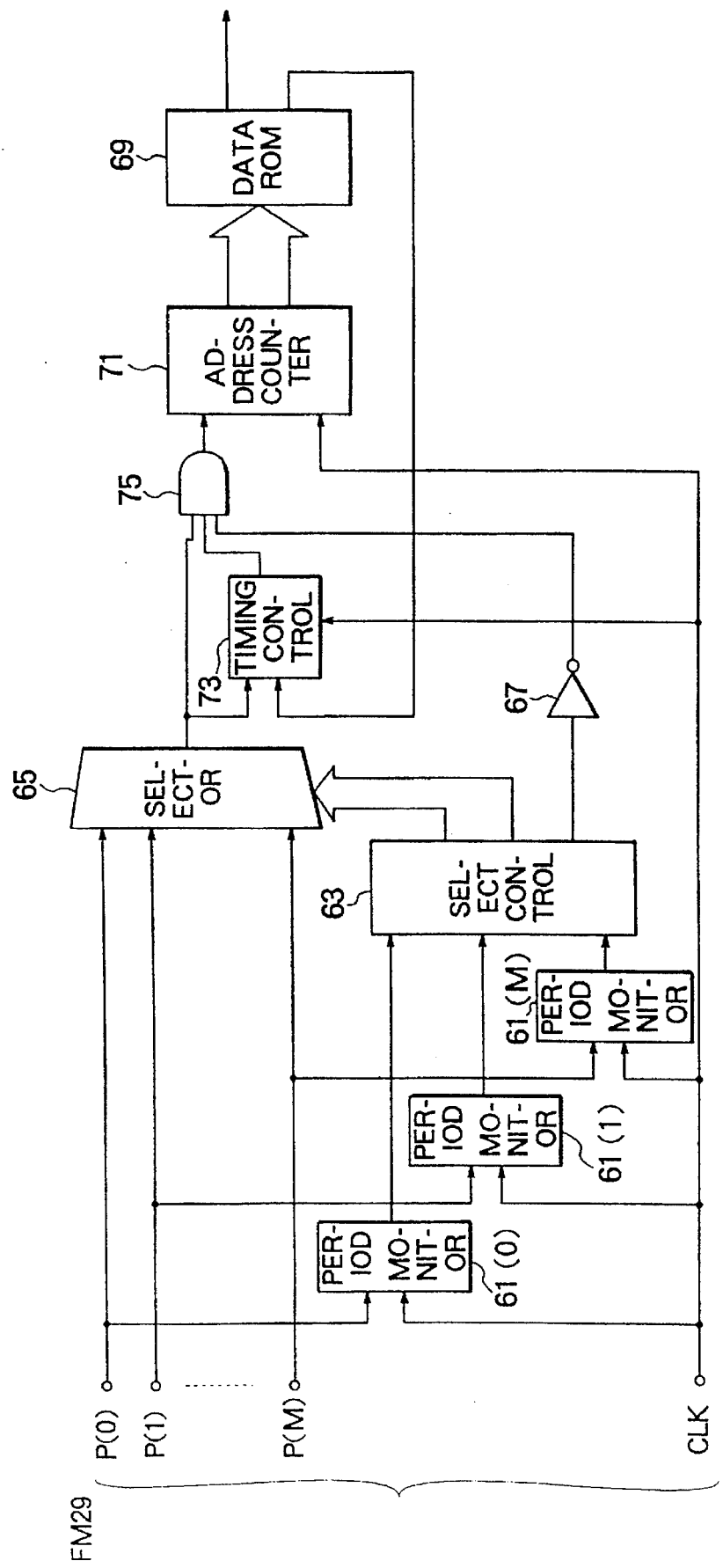
FIG. 12 is a block diagram of a synchronization signal processing system mentioned in conjunction with FIG. 11.

Turning to FIG. 12 with FIG. 11 continually referred to, the time division switches 29 are included in the local switching center 25(O) among the synchronization signal processing system being illustrated. For example, the input trunk circuit 33(0) of FIG. 5 is (M+1)-plicated to collectively receive zeroth through M-th received synchronization signals p(0), p(1), ..., and p(M) in the higher reception signal, where M represents a predetermined integer which is two or more. In the manner described with reference to FIGS. 8 through 10, a sequence of clock pulses CLK is produced instead of the frame pulses. In this case, the synchronization signal indicates the seventh bit B7.

The zeroth through the M-th received synchronization signals are used with predetermined priority degrees and have zeroth through M-th timing relationships with the clock pulses. Zeroth through M-th period monitors 61(0), 61(1), ..., and 61(M) are for monitoring the zeroth through the M-th periods of the zeroth through the M-th received synchronization signals with reference to the clock pulses. The zeroth through the M-th period monitors 61 (suffixes omitted) thereby produce zeroth through M-th confirmation signals indicative of whether the zeroth through the M-th periods are normal or abnormal. The synchronization signals will be called normal and abnormal synchronization signals when their periods are normal and abnormal.

Ordinarily, some of the received synchronization signals are the normal synchronization signals. With reference to the priority degree, a selection controller 63 produces an input selection signal indicative of a particular synchronization signal which has a highest priority degree among the normal synchronization signals.

Controlled by the input selection signal, a synchronization signal selector 65 selects the particular synchronization signal as a selected synchronization signal from the zeroth through the M-th received synchronization signals supplied thereto. The selected synchronization signal has a particular synchronization phase. Incidentally, each of the sychronization signal selectors 39 (FIG. 5) selects the selected sychronization signal in this manner.

If the zeroth through the M-th received synchronization signals are all abnormal synchronization signals, the selection controller 63 produces an all abnormal signal. For the purpose which will presently become clear, an inverter 67 inverts the all abnormal signal into an inverted abnormal signal.

A read-only memory (ROM) 69 is a nonvolatile pattern memory having a plurality of pattern addresses which are equal in number to the time slots in each multiframe period described before with reference to FIGS. 8 and 9 and in which data are preliminarily stored to represent a correct synchronization signal as a memorized synchronization signal. The data are additionally representative of an allowable phase range which will shortly become clear.

Counting the clock pulses, an address counter 71 produces an address signal for use in consecutively accessing the pattern addresses of the nonvolatile pattern memory 69 repeatedly from an initial address. In the manner which will immediately be described, an initial value correction signal is supplied to the address counter 71 to adjust the initial address to a proper address.

When the data are cyclically accessed from the proper address by the address signal, the pattern memory 69 generates a regenerated synchronization signal with a correct regenerated phase. In addition, the pattern memory 69 produces a timing signal representative of the allowable phase range. The regenerated synchronization signal is used as one of the zeroth and the first synchronization signals q0, q1, r0, and r1 in the higher or the lower transmission signal.

Supplied with the selected synchronization signal and the timing signal and controlled by the clock pulses, a timing controller 73 compares the synchronization phase with the allowable phase range. If the synchronization phase is out of the allowable phase range, the timing controller 73 delivers a gate control signal to an AND gate 75, which is supplied with the selected synchronization signal and the inverted abnormal signal to supply the initial value correction signal to the address counter 71.

It will be presumed merely for simplicity of the description that in the seventh bit B7 each of the zeroth through the M-th and the regenerated synchronization signals has a logic one value in a particular time slot of the multiframe period and logic zero values at other time slots in the manner described with reference to FIGS. 8 and 9. Under the circumstances, the data are stored in the nonvolatile pattern memory 69 with the logic one value for the seventh bit B7 at a particular address of the regenerated synchronization signal. For the allowable phase range, at least one logic one value is stored in, for example, the first bit B1 of the data at the particular addresses.

As an initial value correction count, the timing controller 73 counts the number of values which the seventh bit B7 of the selected synchronization signal does not change to logic one value while the first bit B1 of the timing signal keeps the logic one value. When the synchronization phase is out of the allowable phase range in this manner and the initial value correction count reaches a predetermined count, the gate control signal is given the logic zero value until the logic one value is indicated by the first bit B1 of the timing signal concurrently with the logic one value of the seventh bit B7 of the selected synchronization signal.

If at least one of the zeroth through the M-th received signals is the normal synchronization signal, the inverted abnormal signal is given the logic one value. The selected synchronization signal is produced. When the gate control signal is given the logic one value under the circumstances, the logic one value of the seventh bit B7 of the selected synchronization signal passes through the AND gate 75 to become the initial value correction signal.

If all of the zeroth through the M-th received synchronization signals are the abnormal synchronization signals, the inverted abnormal signal is given the logic zero level. As a consequence, the AND gate 75 produces no initial value correction signal. The regenerated synchronization signal is generated with a previous phase which has been given to the regenerated synchronization signal before the received synchronization signals become all abnormal.

In FIG. 12, a combination of the period monitors 61, the selection controller 63, and the synchronization signal selector 65 serves as a selecting arrangement. Another combination of the timing controller 73 and the AND gate 75 serves as a timing control arrangement. The pattern memory 69 and the address counter 71 are equivalent to the pattern memory 55(1) and the address counter 53 described in conjunction with FIG. 8. It should be understood in this connection that the regenerated synchronization signal is given a correct phase in FIG. 12 by the timing control arrangement and in FIG. 8 by using the receive loop back signal and the comparator 59. It is possible to use both the timing control arrangement and the comparator 59 together with the switches 57 particularly when the zeroth and the first received synchronization signals, such as p0 and p1, are used.

Figure 13:
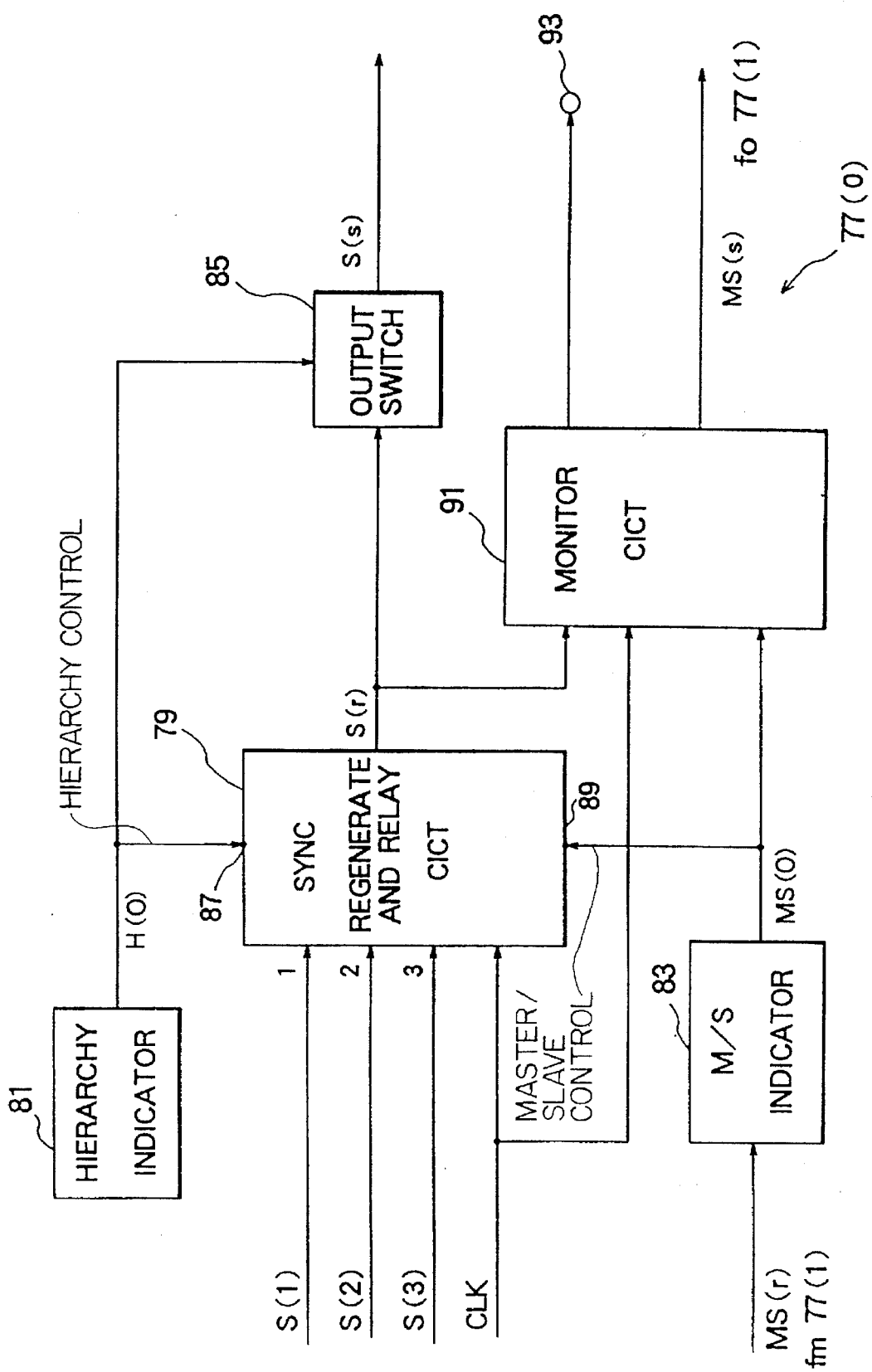
FIG. 13 is a partial block diagram of a synchronization signal processing system according to a fifth embodiment of this invention.

Referring now to FIG. 13, a synchronization (SYNC) trunk device 77 is used as a part of a synchronization signal processing system according to a fifth embodiment of this invention and is alternatively called a synchronization signal regenerate and relay device. It will first be presumed that the trunk device 77 is used in a local switching center 25(O) which is described in conjunction with FIG. 11 and has a local hierarchy. The trunk device 77 receives received synchronization signals of zeroth and first series from a higher hierarchy switching center 25(H) as zeroth and first received synchronization signals p0 and p1.

Such trunk devices are used in pair in each of the central master, the local master, and the terminal mobile service switching centers as synchronization trunk devices of the zeroth and the first series 77(0) and 77(1), which may be called briefly either as zeroth and first synchronization trunk devices or zeroth and first trunk devices. Each of the zeroth and the first trunk devices is supplied with the zeroth and the first received synchronization signals as first and second input signals S(1) and S(2) and a selected synchronization signal as a third input signal S(3). The selected synchronization signal will presently become clear.

When attention is directed to the zeroth trunk device 77(0), the zeroth and the first series will be called local and different series. As for the first trunk device 77(1), the zeroth and the first series are called the different and the local series. Each of the trunk devices comprises a synchronization signal (SYNC) regenerate and relay circuit 79 which is substantially identical with the synchronization processing system illustrated with reference to FIG. 12 and is supplied with the first input signal of the local series, the second input signal of the different series, and the third input signal of the different series as three input signals and with a sequence of clock pulses CLK, a local hierarchy indication signal H(O), and a local master/slave indication signal MS(O).

The first through the third input signals and the clock pulses are supplied to the selecting arrangement described with reference to FIG. 12. Rather than to the three input signals, different degrees of priority are allotted to input terminals of the selection controller 63 of the selecting arrangement in the manner indicated by numerals 1 through 3 attached to the synchronization signal regenerate and relay circuit 79. The numeral 1 indicates a highest degree of priority and the numeral 3, a lowest degree of priority.

The local hierarchy and master/slave indication signals are supplied to the selection controller 63 mentioned above and collectively controls its operation in four controllable states. When put into a first one of the controllable states, the selection controller 63 selects one of the first and the second input signals as a normal signal, in consideration of the different degrees of priority. When put in a second one of the controllable states, the selection controller 63 selects one of the three input signals as the normal signal according to the different degrees of priority.

So selecting the normal signal in each of the first and the second ones of the controllable states, the synchronization signal regenerate and relay circuit 79 generates a regenerated synchronization signal from either the nonvolatile pattern memory 55(1) described in conjunction with FIG. 8 or from the nonvolatile memory 69 of FIG. 12. In the manner described with reference to FIG. 12, the regenerated synchronization signal has a current phase which is adjusted to the normal signal if at least one of the three input signals is normal. If the three input signals are all abnormal, it is impossible to select the normal signal. In this event, the current phase is kept at a previous phase which has been given to the regenerated synchronization signal before either the first and the second input signals or the three input signals went all abnormal. The regenerated synchronization signal is used as an output particular signal S(r).

A hierarchy indicator 81 is for producing the local hierarchy indication signal indicative of whether or not the local hierarchy is a highest hierarchy. the hierarchy indication signal therefore does not indicate the highest hierarchy unless the trunk device 77 is included in the central master mobile service switching center, which may be the higher hierarchy switching device 25(1) described in connection with FIG. 1 or the higher hierarchy switching center 25(H) of FIG. 7 or 11.

A master/slave (M/S) indicator 83 is supplied with a receive master/slave indication signal MS(r) from the trunk device of the different series 77(1) and produces the local master/slave indication signal which indicates one of master and slave states at a time. The master and the slave states may alternatively be referred to merely as first and second states.

The receive master/slave indication signal is used in the trunk device of the different series as a local master/slave signal. When this local master/slave indication signal indicates the master state to the trunk device of the different series 77(1), the local master/slave indication signal of the local trunk device of the local series indicates the slave state to the synchronization signal regenerate and relay circuit 79 being illustrated. In this manner, the master/slave indication signal exclusively indicates the master and the slave states.

An output switch 85 is supplied with the output particular signal and controlled by the local hierarchy indication signal and produces the output particular signal as a switched particular signal S(s). The trunk device of the different series 77(1) is supplied with the switched particular signal of the trunk device of the local series 77(0) as the third input signal thereof. The output switch, such as 85, will later be described.

A hierarchy indication supply point 87 of the synchronization signal regenerate and relay circuit 79 represents a hierarchy control arrangement. Supplied with the local hierarchy indication signal, the hierarchy control arrangement (87) controls the controllable states into first and second states when the local hierarchy indication signal is and is not indicative of the highest hierarchy. The first and the second states will shortly become clear.

A master/slave indication signal supply point 89 of the synchronization signal regenerate and relay circuit 79 indicates a master/slave control arrangement. In response to the local master/slave indication signal, the master/slave control arrangement (89) controls the first state into primary and secondary states and the second state into the first and the second ones of the controllable states when the local master/slave indication signal indicates the master and the slave states.

The synchronization signal regenerate and relay circuit 79 is therefore put into the primary and the secondary states only when included in the trunk device of the zeroth or the first series of the central master mobile service switching center. Otherwise, the synchronization signal regenerate and relay circuit 79 is put only into one of the first and the second ones of the controllable states at a time.

When the primary state is indicated as the controllable states, the normal signal is selected from none of the three input signals. When the controllable states are switched to the secondary state, the normal signal is selected from the third input signal alone. When the controllable states are given the first one thereof, the normal signal is selected from the input signals of the local and the different series. When the controllable states are put into the second one thereof, the normal signal is selected from all of the three input signals.

A monitor circuit 91 is supplied with the output particular signal and the clock pulses. Like the period monitors 61 of the selecting arrangement, the monitor circuit 91 monitors whether the output particular signal is normal or abnormal based on the clock pulses. A result of monitoring is delivered to a synchronization state output terminal 93 as a synchronization state signal. If the output particular signal is abnormal, the synchronization state signal is used as an alarm signal indicative of occurrence of a trouble in the trunk device 77(0) being illustrated. The alarm signal is therefore used as a trunk device trouble signal like the generator trouble signal described in conjunction with FIG. 5.

The local master/slave indication signal is supplied to the monitor circuit 91. As long as the output particular signal is normal, the monitor circuit 91 delivers as a supply master/slave indication signal MS(s) to the trunk device of the different series based on the local master/slave indication signal. If the output particular signal is abnormal, the monitor circuit 91 requires that the trunk device of the different series should be in the master state. The local master/slave indication signal is kept to indicate the slave state.

It is now understood that the trunk device 77 is operable by its hardware logics primarily to select one of the three input signals and to produce the switched particular signal. As an output synchronization signal, the switched particular signal is relayed in the manner which will later become clear.

Figure 14:
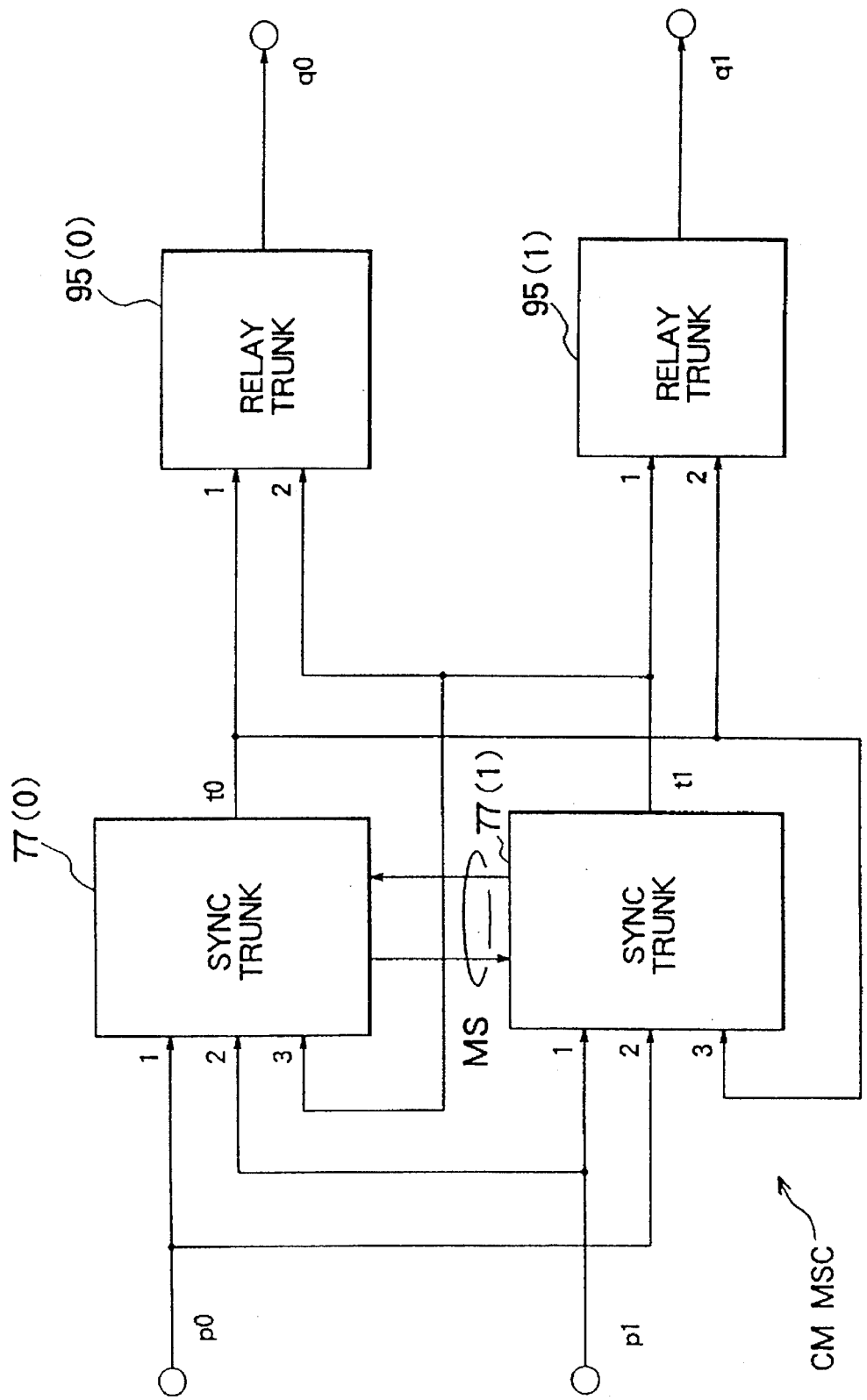
FIG. 14 is a block diagram of the synchronization signal processing system mentioned in connection with FIG. 13.

Turning to FIG. 14 with FIG. 13 continuously referred to, a synchronization signal processing system is for use in a local switching center 25(O) of a local hierarchy which is not a highest hierarchy. The synchronization signal processing system is therefore supplied with received synchronization signals of the zeroth and the first series from a higher hierarchy switching center 25(1) or 25(H) as zeroth and first received synchronization signals, such as p0 and p1.

The synchronization signal processing system comprises synchronization (SYNC) trunk devices of the zeroth and the first series 77(0) and 77(1), which are herein called zeroth and first synchronization trunk devices. Each of the zeroth and the first synchronization trunk devices 77 (suffixes omitted) has a structure illustrated with reference to FIG. 13. In the manner described before, the zeroth and the first series will be called the local and the different series in connection with the zeroth synchronization trunk device 77(0) and the different and the local series with regard to the first synchronization trunk device 77(1).

The zeroth synchronization trunk device 77(0) is supplied with the supply master/slave indication signal from the first synchronization trunk device 77(1) as the receive master/slave indication signal. The first synchronization trunk device 77(1) is similarly controlled by the master/slave indication signal of the zeroth synchronization trunk device 77(0). Such master/slave indication signals are labelled MS. One of the zeroth and the first synchronization trunk devices 77 is consequently operable in the master state while the other of the synchronization trunk devices 77 is put in the slave state.

Each of the synchronization trunk devices 77 has three input terminals assigned with different degrees of priority 1 through 3, which will be called primary and secondary degrees of priority as regards the zeroth and the first synchronization trunk devices. As before, the degree of priority 1 and 3 is highest and lowest degrees of priority.

The zeroth synchronization trunk device 77(0) produces the switched particular signal of the zeroth series as a zeroth particular signal t0. The switched particular signal of the first series is produced by the first synchronization trunk device 77(1) as a first particular signal t1.

The zeroth synchronization trunk device 77(0) is supplied with the zeroth received synchronization signal p0 at the input terminal numbered 1, the first received synchronization signal p1 at the input terminal 2, and the first particular signal as the afore-mentioned selected synchronization signal at the input terminal 3. The first synchronization trunk device 77(1) is supplied with the first received synchronization signal p1 at the input terminal 1, the zeroth received synchronization signal p0 at the input terminal 2, and the zeroth particular signal at the input terminal 3. In this manner, each of the synchronization trunk devices 77 is supplied with the received synchronization signal of the local series with the highest degree of priority and with the particular signal of the different series with the lowest degree of priority.

In FIG. 14, the synchronization signal processing system comprises a relay trunk device of the zeroth series as a zeroth relay trunk device 95(0) and a relay trunk device of the first series as a first relay trunk 95(1). Each of the relay trunk devices 95 (suffixes omitted) has two input terminals assigned with higher and lower degrees of priority 1 and 2.

The particular signals of the local and the different series are supplied to the input terminals 1 and 2 of each relay trunk device 95 and are monitored and then selected according to the degrees of priority. As a supply synchronization signal of the zeroth series, such as q0, the zeroth relay trunk device 95(0) produces one of the zeroth and the first particular signals that is monitored as normal and is selected according to the degree of priority. As a supply synchronization signal of the first series, such as q1, the first relay trunk device 95(1) produces one of the zeroth and the particular signals that is monitored as normal and is selected according to the degrees of priority.

Each of the zeroth and the first relay trunk devices 95 has a structure which is illustrated with reference to FIG. 13 and is simplified as is obvious from the above. Use of the output switch 85 is preferred.

It is preferred that the zeroth synchronization and relay trunk devices 77(0) and 95(0) and the first synchronization and relay trunk devices 77(1) and 95(1) are operable by different power sources. In any event, the illustrated synchronization signal processing system is primarily operable in response to the received synchronization signals to regenerate regenerated synchronization signals in the manner described in conjunction with FIG. 13 and to relay the received synchronization signals as the supply synchronization signals.

Figure 15:
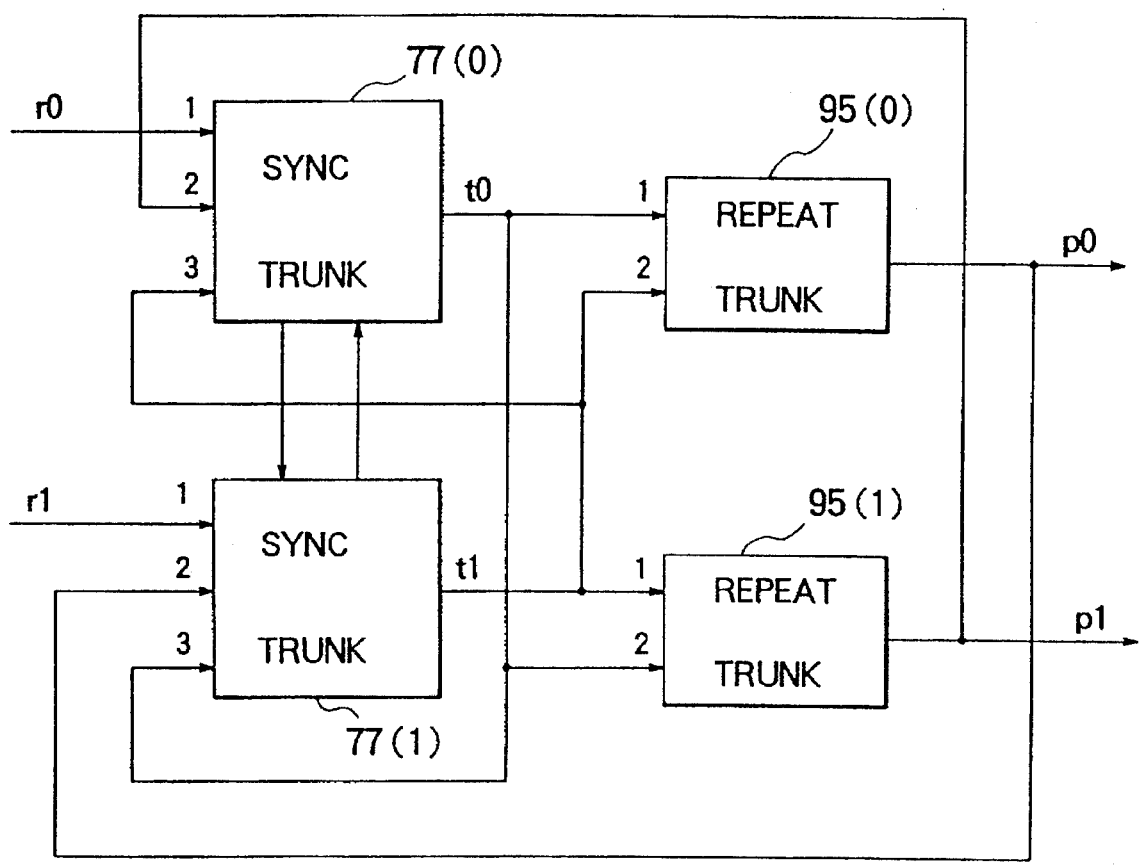
FIG. 15 is a block diagram of a modification of the synchronization signal processing system illustrated in FIG. 14.

Referring afresh to FIG. 15 in addition to FIGS. 13 and 14, the description will proceed to a modification of the synchronization signal processing system illustrated with reference to FIG. 14. Similar parts are designated by like reference numerals and are similarly operable with likewise named signals unless otherwise explicitly mentioned in the following. It should be noted that the relay trunk devices 95 may alternatively be called repeat trunk devices 95 and are so labelled in FIG. 15.

The synchronization signal processing system is for use in a switching center of a highest hierarchy, namely, in the central master mobile service switching center CM MSC described above. The highest hierarchy switching center may be the higher hierarchy switching center 25(1) described in conjunction with FIG. 1 or the higher hierarchy switching center 25(H) of FIG. 7 or 11 and is connected to a lower hierarchy switching center which may be the lower hierarchy switching center 25(2) of FIG. 1 or the local switching center 25(O) described in connection with FIG. 7 or 11.

The synchronization signal processing system therefore processes received synchronization signals of the zeroth and the first series received from the lower hierarchy switching center as zeroth and first received synchronization signals, such as r0 and r1 described with reference to FIG. 11, to supply the lower hierarchy switching center with supply synchronization signals of the zeroth and the first series, such as p0 and p1. Like in FIG. 14, each of the zeroth and the first synchronization trunk devices 77 has a structure illustrated with reference to FIG. 13. Each of the zeroth and the first relay (repeat) trunk devices 95 has a structure of the type of FIG. 13 with simplification.

Each of the synchronization trunk devices 77 is supplied with the received synchronization signal of the local series at its input terminal 1 of the highest degree of priority and with the particular signal of the different series at its terminal 3 of the lowest degree of priority. Each of the relay trunk devices 95 produces the supply synchronization signal of the local series. It should be noted that each of the synchronization trunk devices 77 is supplied with the supply synchronization signal of the different series.

It will readily be understood that each of the zeroth and the first supply synchronization signals is the one of the synchronization signals supplied through the lower connection lines 27(1) to 27(3) depicted in FIG. 6. Delay adjusting the loop back signal B6 of FIG. 4 in the manner described with reference to FIG. 7 through 10, the lower hierarchy switching center produces, as each of the zeroth and the first received synchronization signals, the phase synchronized synchronization signal transmitted through the higher connection lines 27(0) described in connection with FIG. 5.

In the synchronization signal processing system illustrated with reference to FIG. 14 or 15, a combination of the zeroth synchronization and relay trunk devices 77(0) and 95(0) will be called a synchronization signal processing device of the zeroth series. Another combination of the first synchronization and relay trunk devices 77(1) and 95(1) will be called a synchronization signal processing device of the first series.

It may be mentioned in connection with the highest hierarchy switching center that the synchronization signal processing devices of the zeroth and the first series may both be involved in troubles. When the troubles are removed in at least one of the synchronization signal processing devices of both series, a phase jump may occur before occurrence and after recovery of the trouble in the zeroth or the first supply synchronization signals generated by this one of the synchronization signal processing devices. In the manner described in conjunction with FIG. 14, it is preferred that the synchronization signal processing devices of the zeroth and the first series are operable by different power sources.

Figure 16:
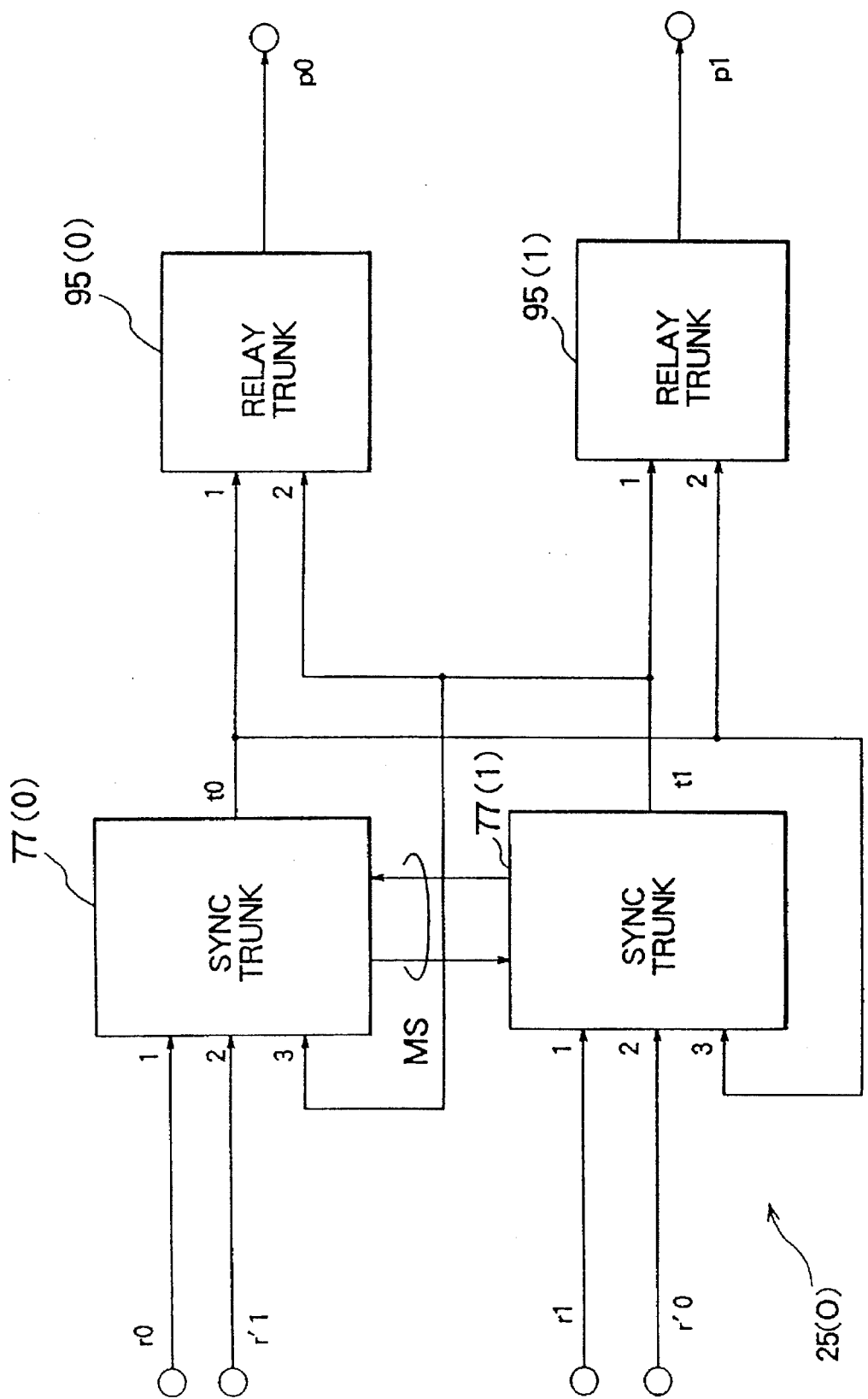
FIG. 16 is a block diagram of another modification of the synchronization signal processing system depicted in FIG. 14.

Turning to FIG. 16 with FIGS. 13 through 15 continually referred to, the description will proceed to another modification of the synchronization signal processing system illustrated with reference to FIGS. 14. Similar parts are again designated by like reference numerals and are similarly operable with likewise named signal.

The synchronization signal processing system is for use in the highest hierarchy switching center connected to two or more lower hierarchy switching centers which are the local master mobile service switching centers described before. It will be assumed that the synchronization signal processing system receives primary received synchronization signals of the zeroth and the first series from a first lower hierarchy switching center as primary zeroth and first received synchronization signals r0 and r1 and secondary received synchronization signals of the zeroth and the first series from a second lower hierarchy switching center as secondary zeroth and first received synchronization signals r'0 and r'1.

It is possible to understand that either the lower hierarchy switching center 25(2) or the local switching center 25(O) of FIG. 7 or 11 shows the first and the second lower hierarchy switching centers in duplicate. It is alternatively possible to understand that the local hierarchy and the lower hierarchy switching center 25(L) are the highest hierarchy and the first lower hierarchy switching center and that the switching center 25(H) is the second lower hierarchy switching center although called the "higher hierarchy" switching center therein.

Supply synchronization signals of the zeroth and the first series are generated and sent to one of the first and the second lower switching centers as zeroth and first supply synchronization signals p0 and p1. It should be understood a similar pair of supply synchronization signals should be supplied to the other of the first and the second lower hierarchy switching centers. Only one pair is, however, illustrated.

Like in FIG. 14, each of the zeroth and the first synchronization trunk devices 77 is supplied with the primary received synchronization signal of the local series at its input terminal 1 of the highest priority and with the particular signal of the different series at its input terminal 3 of the lowest priority. The secondary received synchronization signal of the different series is supplied to the input terminal 2 of the middle priority. It is possible to supply the secondary received synchronization signal of the local series to the input terminal i and the primary received synchronization signal of the different series to the input terminal 2.

In other respects, the circuitry is similar to that illustrated with reference to FIG. 14. Advantages are achieved like those described in conjunction with FIG. 15.

Figure 17:
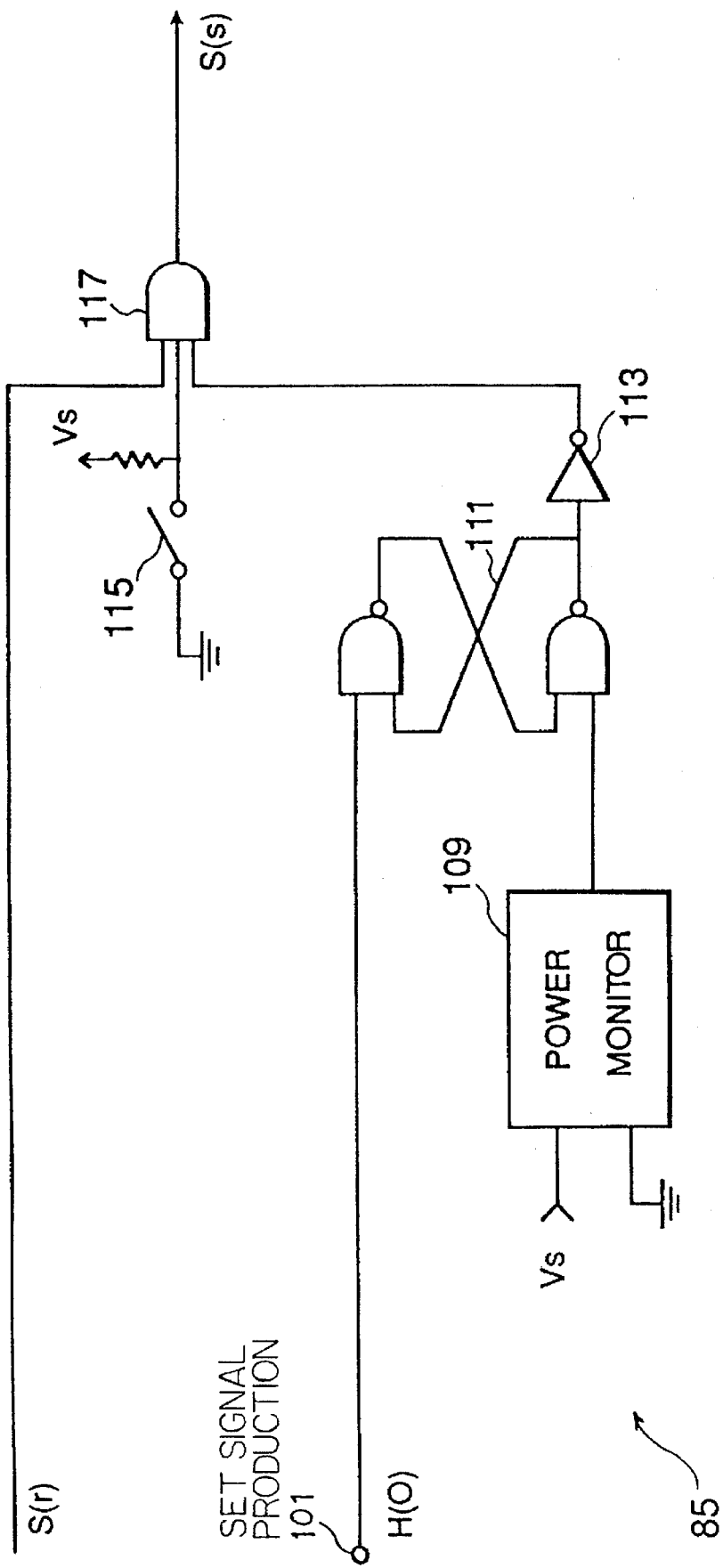
FIG. 17 is a block diagram of an output switch for use in the synchronization signal processing system illustrated in FIG. 13.

Referring to FIG. 17, the output switch 85 of FIG. 13 is used in each of the zeroth and the first synchronization trunk devices 77 and the zeroth and the first relay trunk devices 95 described in conjunction with FIGS. 14 through 16. In the manner described with reference to FIG. 13, the output switch 85 is supplied with the output particular signal S(r) and controlled by the local hierarchy indication signal H(O) and switches the switched particular signal S(s). In the example being illustrated, the local hierarchy indication signal is given a high and a low level to indicate the highest hierarchy and others, respectively. The synchronization and the relay trunk devices 77 and 95 of each of the zeroth and the first series may comprise the hierarchy indicator 81 of FIG. 13 in common. The local hierarchy indication signal is received at a local input terminal 101.

In the manner described in connection with FIG. 14, the synchronization and the relay trunk devices 77 and 95 of each series are put in operation by a power source of a source voltage Vs.

A power monitor 109 is for monitoring the source voltage and produces a reset signal which has a logic zero level when the source voltage decreases below a predetermined voltage. The local hierarchy indication signal is used as a set signal of the logic zero level when the local hierarchy indication signal is not indicative of the highest hierarchy. A flip-flop circuit 111 is set by the set signal of the logic zero level and reset by the reset signal of the logic zero level to produce a flip-flop output signal, which is inverted by a set/reset inverter 113 into a first AND input signal given a logic one level only while the flip-flop circuit 111 is set.

When manually closed, a control switch 115 produces a control signal. Pulled up by the source voltage, the control signal provides a second AND input signal. The control switch 115 is usually open to give the logic one level to the second AND input signal.

A three-input AND gate 117 is supplied with the output particular signal as a third AND input signal. Controlled by the first and the second AND input signals, the AND gate 117 produces or does not produce the switched particular signal.

Such output switches 85 are for reliable maintenance of the synchronization processing system of the local hierarchy, particularly of each of the synchronization trunk devices 77 used in the switching center of the highest hierarchy. When a trouble occurs in the power source, each output switch 85 stops supply of the switched particular signal.

Referring again to FIGS. 15 and 16 in addition to FIG. 17, use of the output switch 85 will be described. It is assumed that a new synchronization or relay trunk device 77(n) or 95(n) must be substituted for an old synchronization or relay trunk device 77(o) or 95(o) that has gone into a trouble.

The description will first be directed either to the synchronization or the relay trunk device 77 or 95 used in a switching center of other than the highest hierarchy. In such an event, the control switch 115 is closed in the new synchronization or relay trunk device before mounting or setting in position of the new synchronization or relay trunk device. After confirmation of the synchronization state signal described in connection with FIG. 13, the control switch 115 is turned open.

The description will now be directed either to the synchronization or the relay trunk device 77 or 95 used in the switching center of the highest hierarchy. Should either the synchronization or the relay trunk devices 77 or 95 of the zeroth and the first series be replaced by new trunk devices, a new trunk device is first substituted for one of the old trunk device.

Before substitution, the control switch 115 is closed in the new trunk device. Furthermore, the hierarchy indicator 81 of FIG. 13 is made to temporarily produce the local hierarchy indication signal which is not indicative of the highest hierarchy.

As soon as set into position, the new trunk device can select either of its input terminals 1 and 2 of the highest and the middle degrees of priority and can not produce the switched particular signal. After confirmation of the synchronization state signal, the local hierarchy indication signal is made to indicate the highest hierarchy. The new synchronization trunk device now can not select its input terminals 1 and 2. On the other hand, the new relay trunk device can select its terminal 1 or 2. Finally, the switch 115 is turned open.

The synchronization signal processing system can nevertheless be operable in the master state to generate the supply synchronization signal of a concerned one of the zeroth and the first series with no phase jump because the received synchronization signals are supplied from one of four lower hierarchy switching centers.

Another new synchronization trunk device is now substituted for the other of the old synchronization trunk devices. Before substitution, the control switch 115 is not turned open but is kept closed. After substitution, the synchronization state signal is confirmed. In addition, it is ensured that the new synchronization trunk device selects the particular signal of the different series supplied to its input terminal 3. Furthermore, the hierarchy indicator 81 of FIG. 13 is set temporarily to the none-highest hierarchy state and is subsequently set to the highest hierarchy state. This new synchronization trunk device is rendered operable in the slave state. Eventually, both synchronization trunk devices 77 are operable exclusively in the master and the slave states.

If only one of the synchronization trunk devices 77 is involved in a trouble, the other of the synchronization trunk devices 77 is kept in the master state. Substitution of a new synchronization trunk device is therefore carried out in the manner last described. If the trouble or the troubles come from the power source or power sources, it is possible to remove the trouble in the manner described above without using new synchronization trunk device or devices but using the synchronization trunk device or devices currently used.

In FIG. 17, the local input terminal 101 is used as a set signal producing arrangement. A combination of the flip-flop circuit 111 and the set/reset inverter 113 serves as a flip-flop arrangement. The control switch 115 may be called a control switch arrangement together with an accompanying pull-up circuit. Attention may be directed to only the first and the second AND input signals, which may alternatively be referred to as first and second control signals.

While this invention has thus far been described in conjunction with an appreciable number of preferred embodiments thereof and several modifications, it will now be readily possible for one skilled in the art to put this invention into effect in various other manners. For example, it is possible to use more than two time division switches, such as 79, in each synchronization signal processing system. For a more reliable operation of the mobile communication networks and for easier maintenance of the synchronization signal processing system, it is possible to use synchronization signals of one or more than one additional series, such as a second series, in addition to the synchronization signals of the zeroth and the first series, with the synchronization and the relay trunk devices 77 and 95 accordingly increased in number. It is furthermore possible to use a plurality of pairs of the relay trunk devices for the synchronization trunk devices of the zeroth and the first series, with each pair composed of the relay trunk devices, such as 95(0) and 95(1), in which each relay trunk device is supplied with the zeroth and the first particular signals. When used in dealing with the synchronization signals of the zeroth and the first series, each of the period monitors 61 of FIG. 12 is used in connection with the signal of one of the series with the selection controller 63 and the signal selector 65 preferably controlled by a signal indicative of the zeroth and the first series.

What is claimed is:

1. A synchronization signal processing system for processing a plurality of received synchronization signals having their periods and different degrees of priority to generate a regenerated synchronization signal in response to clock pulses, said synchronization signal processing system comprising:

selecting means for selecting from at least one of said received synchronization signals that has its period correctly, a selected synchronization signal in consideration of said different degrees of priority;

a nonvolatile memory for memorizing a memorized synchronization signal and an allowable phase range;

an address counter having a controllable initial value for counting said clock pulses to produce a clock count from time to time and to make said nonvolatile memory produce said memorized synchronization signal as a read-out synchronization signal and said allowable phase range as a read-out phase range in response to said clock count; and initial value control means supplied with said selected synchronization signal and said read-out phase range for controlling said controllable initial value to be a value at which said read-out synchronization signal and said read-out phase range are read when said selected synchronization signal has a phase in said read-out phase range, said initial value control means making said address counter read said read-out synchronization signal from said nonvolatile memory as said regenerated synchronization signal.

* * * * *